US012352097B2

(12) United States Patent
Miyamae

(10) Patent No.: US 12,352,097 B2
(45) Date of Patent: Jul. 8, 2025

(54) STOPPER DEVICE

(71) Applicant: PIOLAX, INC., Kanagawa (JP)

(72) Inventor: Hitoshi Miyamae, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 22 days.

(21) Appl. No.: 18/279,312

(22) PCT Filed: Feb. 8, 2022

(86) PCT No.: PCT/JP2022/004942
§ 371 (c)(1),
(2) Date: Aug. 29, 2023

(87) PCT Pub. No.: WO2022/190744
PCT Pub. Date: Sep. 15, 2022

(65) Prior Publication Data

US 2024/0141709 A1 May 2, 2024

(30) Foreign Application Priority Data

Mar. 12, 2021 (JP) ................................ 2021-040076

(51) Int. Cl.
*E05F 5/02* (2006.01)

(52) U.S. Cl.
CPC ......... *E05F 5/025* (2013.01); *E05Y 2900/532* (2013.01)

(58) Field of Classification Search
CPC .... E05F 5/025; E05F 5/022; E05Y 2900/532; E05Y 2600/12
See application file for complete search history.

(56) References Cited

U.S. PATENT DOCUMENTS 3,994,043 A * 11/1976 Gurzenda ................ E05F 5/06 16/86 A
4,941,580 A * 7/1990 Julian .................... B65D 41/32 215/235
6,507,976 B2 * 1/2003 Ichimaru .............. F16B 21/075 248/188.4

(Continued)

FOREIGN PATENT DOCUMENTS

JP 2006-051889 A 2/2006
JP 2006-062633 A 3/2006

OTHER PUBLICATIONS

Mar. 22, 2022, International Search Report issued for related PCT Application No. PCT/JP2022/004942.

(Continued)

*Primary Examiner* — Jason W San
*Assistant Examiner* — Matthew J Sullivan
(74) *Attorney, Agent, or Firm* — Paratus Law Group, PLLC

(57) ABSTRACT

A stopper device includes: a base member; a shaft member; a rotary member; a gear member disposed inside the rotary member; a temporary fixing portion configured to temporarily fix the gear member to the shaft member; and a cam mechanism including a cam slope and a cam abutting portion. When the gear member rotates in conjunction with a rotation of the rotary member, the shaft member is ascended by the cam mechanism. The gear member further includes a permanent fixing portion configured to restrict an ascending and descending motion of the shaft member in an ascended state.

9 Claims, 28 Drawing Sheets

(56) References Cited

U.S. PATENT DOCUMENTS

| | | | | |
|---|---|---|---|---|
| 6,676,201 | B2 * | 1/2004 | Im | B60J 5/101<br>296/207 |
| 7,114,217 | B2 * | 10/2006 | Matsuzawa | E05F 5/022<br>16/2.2 |
| 8,123,058 | B2 * | 2/2012 | Brozell | B65D 50/046<br>215/334 |
| 8,616,622 | B2 * | 12/2013 | Davis | E05F 5/022<br>296/193.11 |
| 9,580,951 | B2 * | 2/2017 | Duprez | B60J 5/107 |
| 9,963,917 | B2 * | 5/2018 | Reyes Luna | E05F 5/022 |
| 10,150,355 | B2 * | 12/2018 | Yon | F16B 33/004 |
| 10,619,394 | B2 * | 4/2020 | Bell | F16B 43/00 |
| 10,689,894 | B2 * | 6/2020 | Diez Herrera | E05F 5/022 |
| 10,961,763 | B2 * | 3/2021 | Diez Herrera | E05F 5/025 |
| 11,066,863 | B2 * | 7/2021 | de Marco | E05F 5/022 |
| 11,834,891 | B2 * | 12/2023 | Sanchez Burger | E05F 5/022 |
| 12,006,757 | B2 * | 6/2024 | Kim | E05F 5/025 |
| 2002/0003993 | A1 * | 1/2002 | Ichimaru | F16B 5/0657<br>411/325 |
| 2004/0221424 | A1 * | 11/2004 | Matsuzawa | E05F 5/022<br>16/86.2 |
| 2012/0108098 | A1 * | 5/2012 | Burris | H01R 13/639<br>439/345 |
| 2015/0167359 | A1 * | 6/2015 | Reyes Luna | E05B 83/24<br>292/216 |
| 2016/0303960 | A1 * | 10/2016 | Yon | B60J 10/50 |
| 2019/0301221 | A1 * | 10/2019 | Lamoureux | E05F 5/022 |
| 2024/0141709 | A1 * | 5/2024 | Miyamae | E05F 5/022 |

OTHER PUBLICATIONS

Mar. 22, 2022, International Search Opinion issued for related PCT Application No. PCT/JP2022/004942.

* cited by examiner

STOPPER DEVICE

CROSS REFERENCE TO PRIOR APPLICATION

This application is a National Stage Patent Application of PCT International Patent Application No. PCT/JP2022/004942 (filed on Feb. 8, 2022) under 35 U.S.C. § 371, which claims priority to Japanese Patent Application No. 2021-040076 (filed on Mar. 12, 2021), which are all hereby incorporated by reference in their entirety.

TECHNICAL FIELD

The present invention relates to a stopper device disposed between a fixed member and a movable member that moves toward and away from the fixed member.

BACKGROUND ART

For example, a movable member such as a back door is attached in an openable and closable manner to an opening of a fixed member such as a body on a cargo compartment side of an automobile. A stopper device is often disposed between the movable member and the fixed member to suppress the movable member from directly colliding with the fixed member to avoid impact.

As the stopper device described above, Patent Literature 1 below describes a buffer device with a self-adjustable stopper, including a substantially cylindrical socket, a ring rotatably attached to the socket, and a buffer head housed in the ring so as to be ascendable and descendable.

A pawl is formed on an outer periphery of the socket to suppress the ring from coming off. An annular collar protrudes from the outer periphery of an upper end of the ring, a protrusion piece (thrust ramp) having an inclined surface protrudes from a lower end of the ring, and a notch is formed above the protrusion piece. The pawl on the outer periphery of the socket engages in the notch, so that the ring is retained in the socket to suppress the ring from coming off. A groove is formed in an inner surface of the ring and meshes with a groove formed in an outer periphery of a shaft of the buffer head.

When the ring is rotated, the ring ascends through the inclined surface of the protrusion piece, the shaft meshing with a groove of a buffer stop head ascends accordingly, and the entire buffer head ascends.

CITATION LIST

Patent Literature

Patent Literature 1: U.S. Pat. No. 9,580,951B2

SUMMARY OF INVENTION

Technical Problem

In the buffer device in the above Patent Literature 1, when rotating the ring, it is necessary to directly rotate the ring by gripping the collar on the outer periphery of the upper end of the ring, which is exposed from an opening at an upper end of the socket. In this case, since the ring rotates while ascending due to the inclined surface of the protrusion piece, a pushing force from the ring is applied to a hand of an operator during the rotation operation of the ring, and it cannot be said that operability of the ring is good.

Therefore, an object of the present invention is to provide a stopper device capable of improving operability of a rotary member when fixing a position and adjusting a protrusion amount of an abutting portion with respect to a fixed member or a movable member.

Solution to Problem

In order to achieve the above object, the present invention provides a stopper device configured to be disposed between a fixed member and a movable member configured to move toward and away from the fixed member, including: a base member configured to be fixed to either the fixed member or the movable member; a shaft member having an abutting portion configured to abut on another of the fixed member and the movable member, and housed in the base member so as to be ascendable and descendable in a rotation restricted state: a rotary member mounted so as to be rotatable and not to be ascendable and descendable with respect to the base member; a gear member disposed inside the rotary member in a state where rotation is restricted with respect to the rotary member; a temporary fixing portion disposed between the shaft member and the gear member and configured to temporarily fix the gear member to the shaft member; and a cam mechanism disposed between the base member and the gear member, including a cam slope and a cam abutting portion configured to abut on the cam slope, and configured to cause the gear member to ascend by rotation of the rotary member in a predetermined direction, in which when the gear member rotates in conjunction with the rotation of the rotary member, the shaft member is ascended by the cam mechanism while maintaining a temporary fixing state of the shaft member by the temporary fixing portion, and the gear member further includes a permanent fixing portion configured to restrict an ascending and descending motion of the shaft member in an ascended state.

Advantageous Effects of Invention

According to the present invention, when the movable member is brought close to the fixed member, either the fixed member or the movable member abuts on the abutting portion, and the shaft member temporarily fixed by the temporary fixing portion is pushed in via the abutting portion. Next, when the rotary member is rotated after the movable member is away from the fixed member, the gear member rotates in conjunction therewith, and the shaft member is ascended by the cam mechanism while the temporary fixing state of the shaft member is maintained, and the ascending and descending motion of the shaft member is further regulated by the permanent fixing portion of the gear member, and thus, a protrusion amount of the abutting portion is adjusted and a position thereof is fixed. In a rotation operation of the rotary member, the rotary member itself does not ascend and descend with respect to the base member, and only the gear member ascends inside the rotary member, and thus, no extra force is applied to an operator during the rotation operation of the rotary member, and operability of the rotary member can be improved.

BRIEF DESCRIPTION OF DRAWINGS

FIGS. 26A and 26B show relationship between a flange portion of the base member and a rotary member in the state in FIG. 25, where (a) FIG. 26A is a bottom view thereof and (b) FIG. 26B is an enlarged perspective view of a main part.

FIGS. 28A and 28B show relationship between a flange portion of the base member and a rotary member in the state in FIG. 27, where FIG. 28A is a bottom view thereof and FIG. 28B is an enlarged perspective view of a main part.

FIGS. 30A and 30B show relationship between a flange portion of the base member and a rotary member in the state in FIG. 29, where FIG. 30A is a bottom view thereof and FIG. 30B is an enlarged perspective view of a main part.

DESCRIPTION OF EMBODIMENTS

Embodiment of Stopper Device

Hereinafter, an embodiment of a stopper device according to the present invention will be described with reference to FIGS. 1 to 18.

Figure 13:
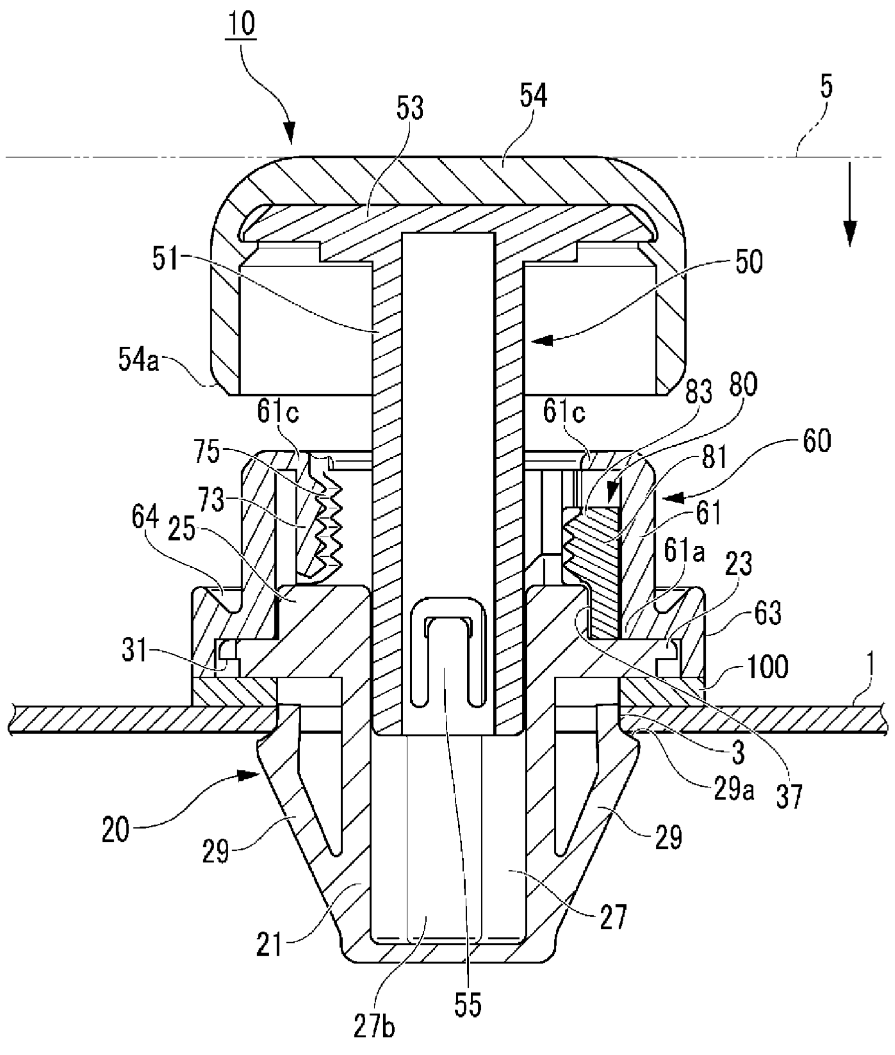
FIG. 13 is a cross-sectional view taken along a line B-B in FIG. 2.
Figure 14:
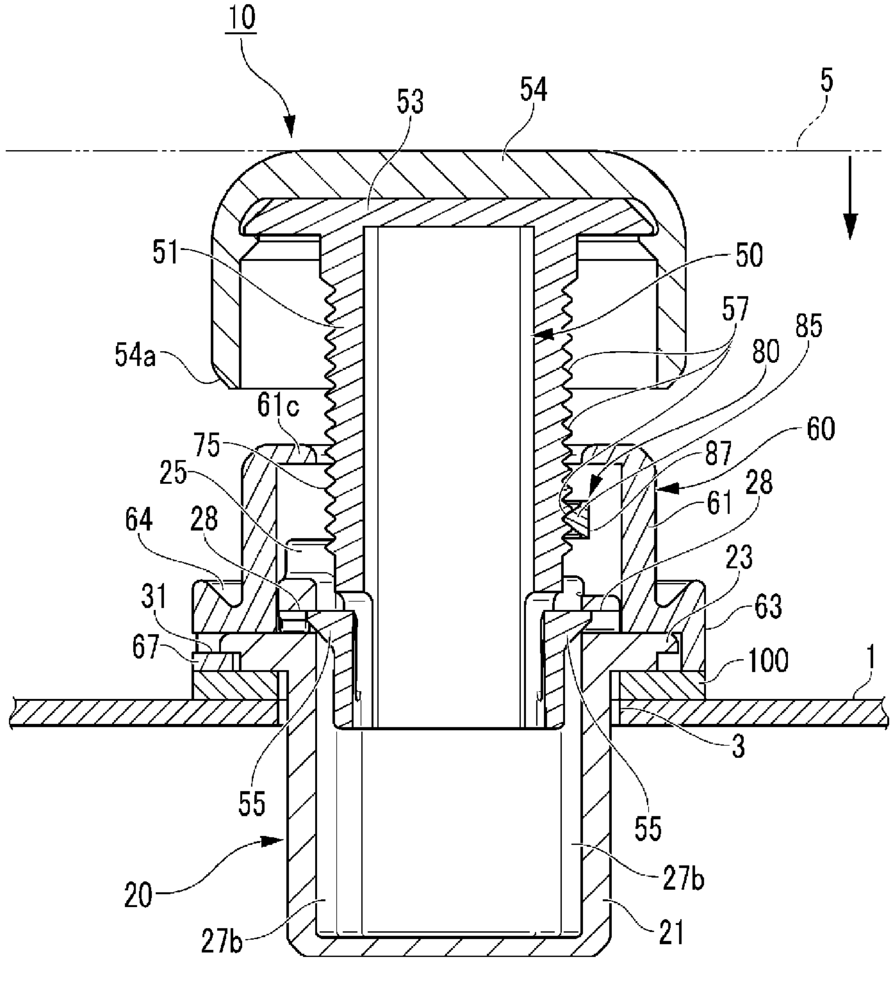
FIG. 14 is a cross-sectional view taken along an arrow line D-D in FIG. 2.

As shown in FIGS. 13 and 14, a stopper device 10 is disposed between a fixed member 1 and a movable member 5 that moves toward and away from the fixed member 1, and suppresses the movable member 5 from directly colliding with the fixed member 1 when the movable member 5 moves toward the fixed member 1, thereby avoiding impact. A fixing hole 3 is formed in the fixed member 1 (see FIG. 1).

Examples of the fixed member 1 may include a vehicle body panel, a vehicle body frame, and a box of a glove box, and examples of the movable member 5 may include a vehicle door (including a sliding door, a hatchback door, a back door, and the like), a lid of a glove box, and a bonnet.

Figure 1:
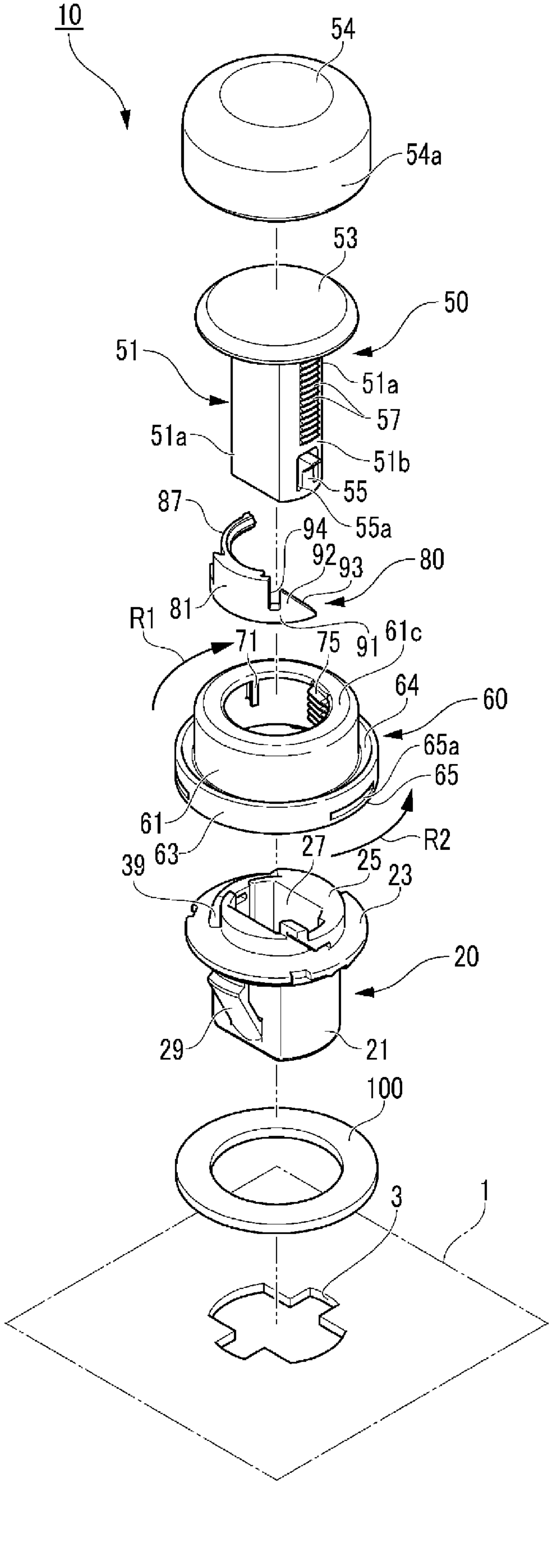
FIG. 1 is an exploded perspective view showing an embodiment of a stopper device according to the present invention.

As shown in FIG. 1, the stopper device 10 according to the present embodiment mainly includes a base member 20 fixed to the fixed member 1, a shaft member 50 having an abutting portion 54 that abuts on the movable member 5, and housed in the base member 20 so as to be ascendable and descendable in a rotation restricted state, a rotary member 60 mounted so as to be rotatable and not to be ascendable and descendable with respect to the base member 20, a gear member 80 disposed inside the rotary member 60 in a state where rotation is restricted with respect to the rotary member 60, and an annular seal ring 100 disposed between the rotary member 60 and the fixed member 1.

The stopper device 10 further includes a temporary fixing portion which is disposed between the shaft member 50 and the gear member 80, and temporarily fixes the gear member 80 to the shaft member 50 in a manner of pushing the shaft member 50 in a direction where the abutting portion 54 comes close to the fixed member 1, and a cam mechanism which is disposed between the base member 20 and the gear member 80, includes a cam slope 39 and a cam abutting portion 89*a* that abuts on the cam slope 39, and causes the gear member 80 to ascend by rotation of the rotary member 60 in a predetermined direction.

"ascending and descending" of the shaft member 50 and the gear member 80 means reciprocating movement in a direction along a rotation axis C (see FIG. 2) (rotation axial direction) of the rotary member 60 with respect to the base member 20, "ascending" means moving in a direction of an arrow C1 on one end side of the rotation axis C (moving in a direction away from the fixed member 1), and "descending" means moving in a direction of an arrow C2 on the other end side of the rotation axis C (moving in a direction toward the fixed member 1).

Figure 2:
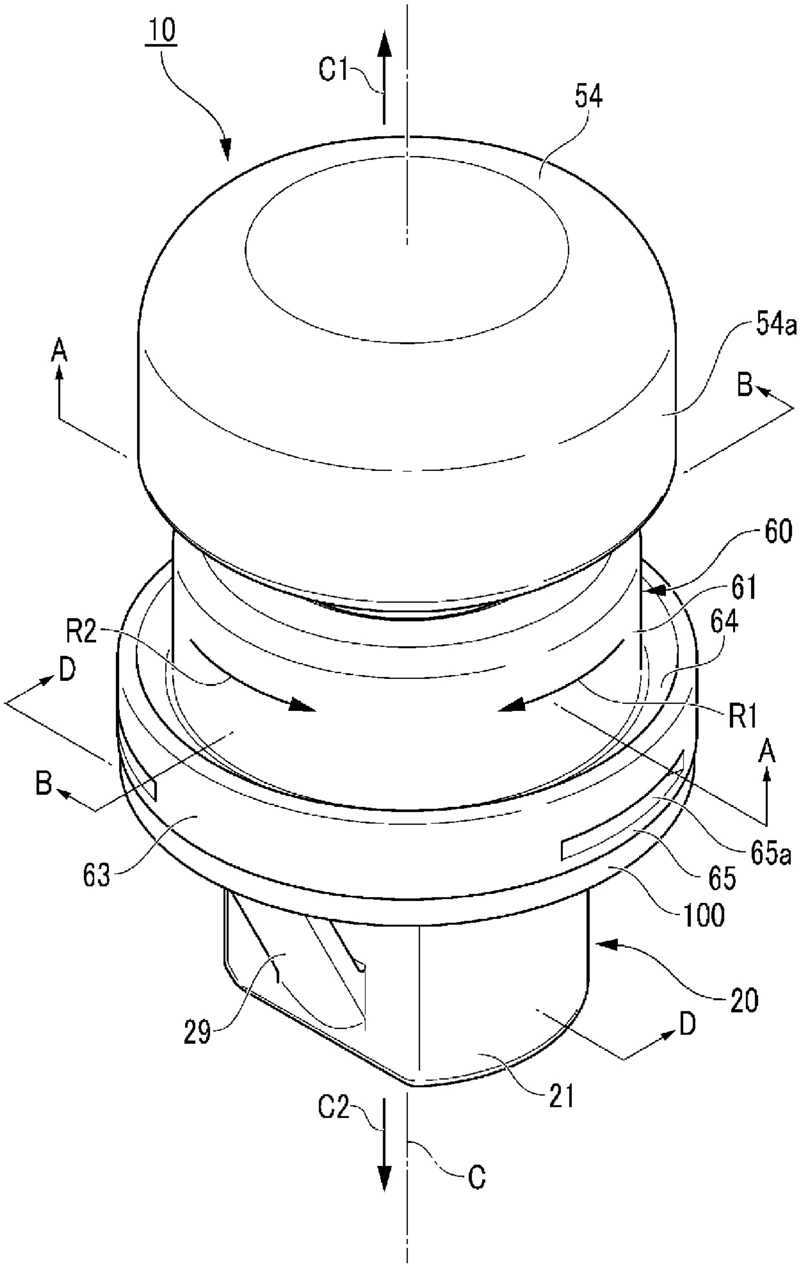
FIG. 2 is a perspective view of the stopper device.

As shown in FIG. 2, by causing the rotary member 60 to rotate in a direction indicated by an arrow R1 with respect to the base member 20, the gear member 80 can be rotated in conjunction with the rotary member 60 (rotated together), and the gear member 80 and the shaft member 50 can be ascended (details will be described later). The rotation direction (rotation direction in a case of causing the rotary member 60 to rotate such that the gear member 80 is ascended by the cam mechanism) of the rotary member 60 in this case is also referred to as "rotation direction R1" or "R1 direction" in the following description.

On the other hand, after causing the rotary member 60 to rotate in the R1 direction, by causing the rotary member 60 to rotate in a direction indicated by an arrow R2 (direction opposite to the rotation direction R1) in FIG. 2, the gear member 80 can be rotated together, and the gear member 80 can be descended and return to an initial state (details will be described later). The rotation direction of the rotary member 60 in this case is also referred to as "return direction R2" or "R2 direction" in the following description.

Figure 10:
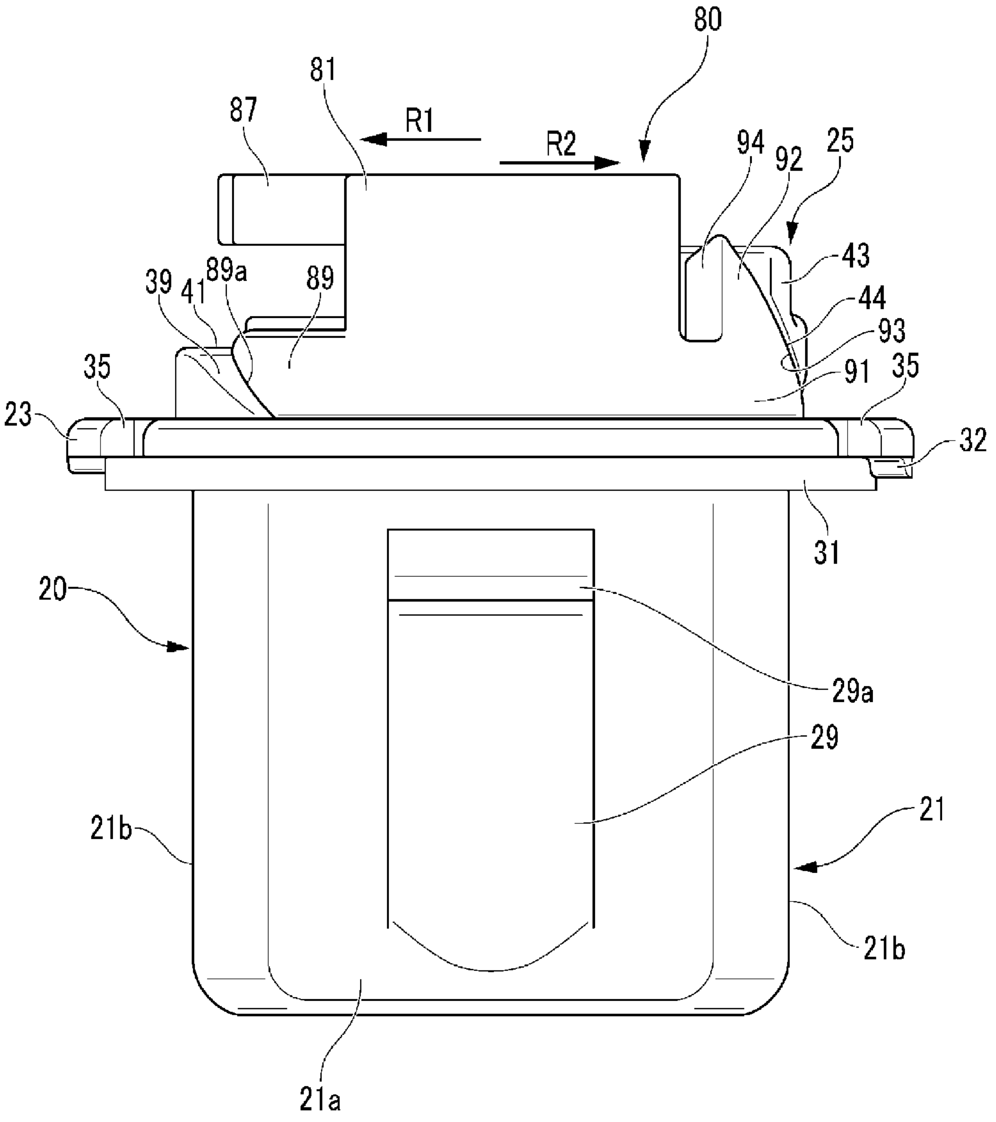
FIG. 10 is a front view of the stopper device in a state before causing the rotary member to rotate with respect to the base member.
Figure 11:
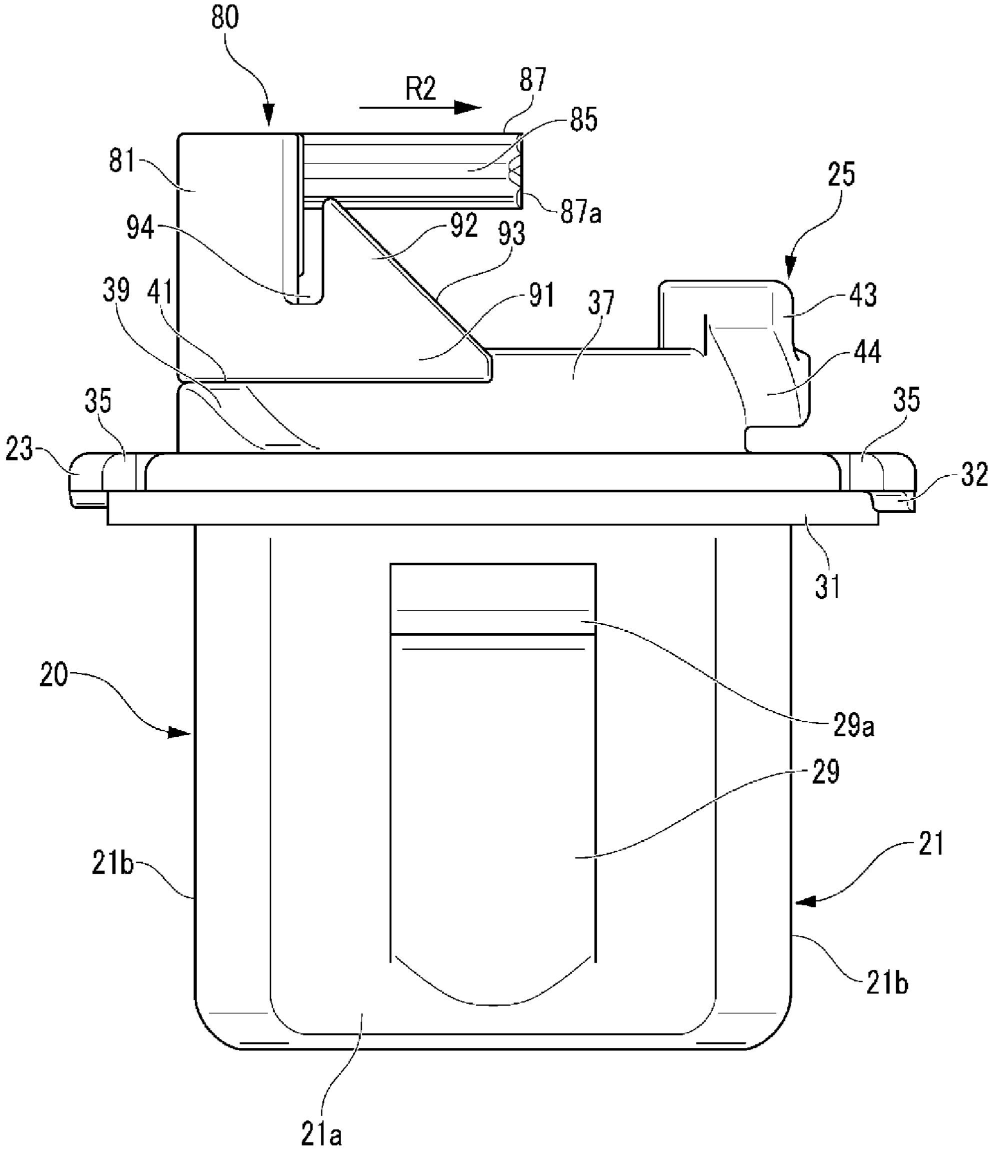
FIG. 11 is a front view of the stopper device in a state after causing the rotary member to rotate with respect to the base member.
Figure 12:
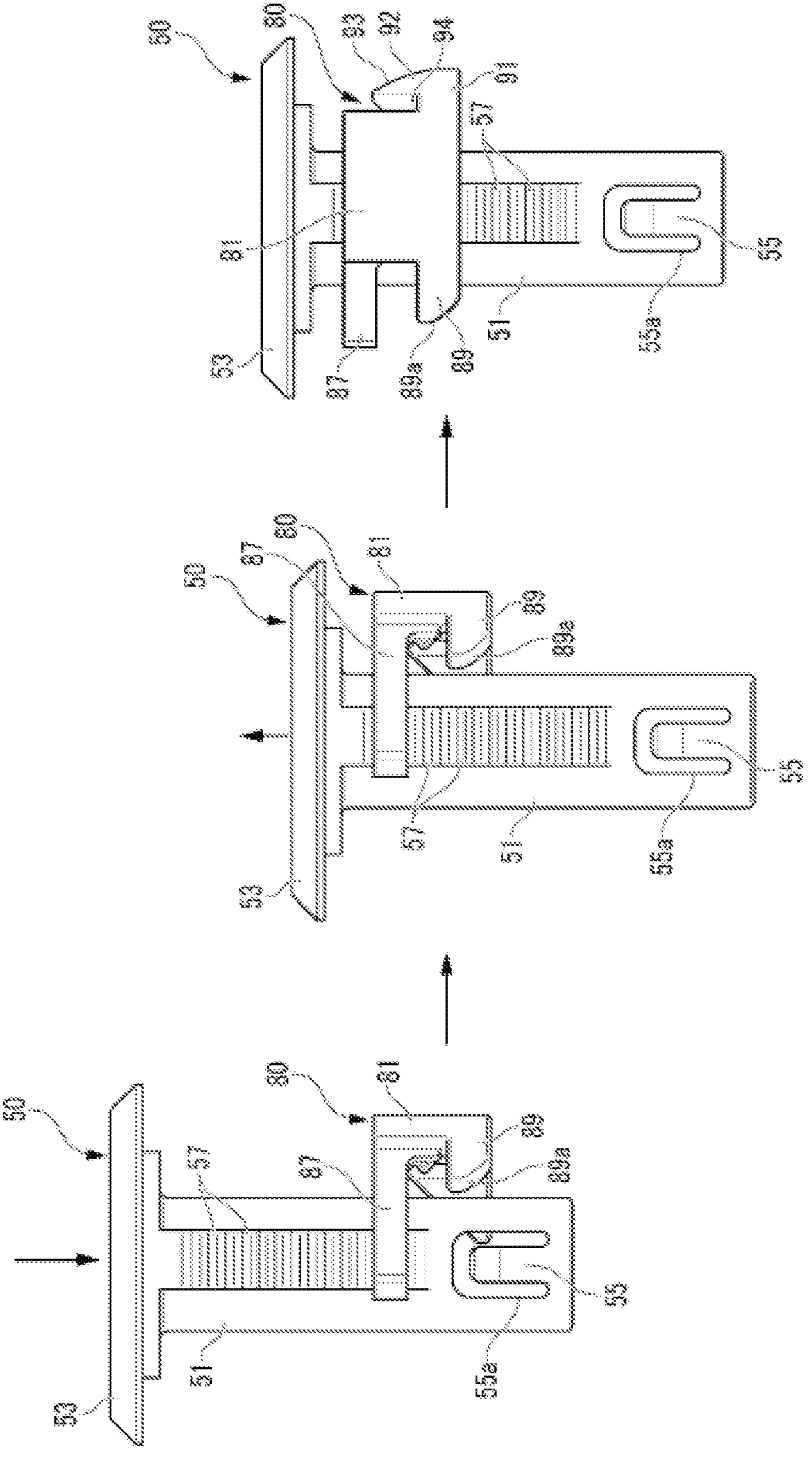
FIG. 12 shows a relationship between the shaft member and the gear member in the stopper device, where a left figure is an explanatory view of a state before the shaft member is pushed in, a central figure is an explanatory view of a state where the shaft member is pushed in and descends, and a right figure is an explanatory view of a state where the shaft member ascends from the state in the central figure.

In order to make the figures easier to understand, for convenience, only the base member 20 and the gear member 80 are shown in FIGS. 10 and 11, and only the shaft member 50 and the gear member 80 are shown in FIG. 12.

First, the base member 20 will be described.

Figure 3:
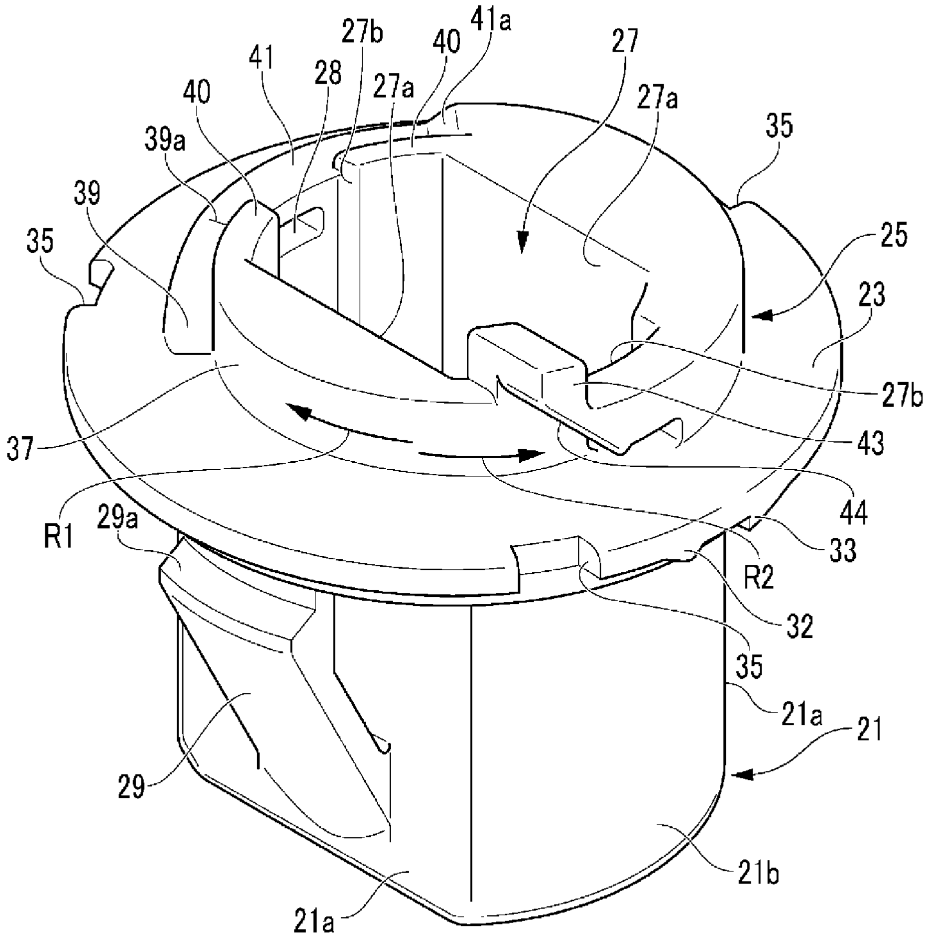
FIG. 3 is an enlarged perspective view of a base member constituting the stopper device.

Referring also to FIG. 3, the base member 20 according to the present embodiment includes a bottomed cylindrical base body 21 inserted into the fixing hole 3, a substantially annular flange portion 23 provided on an outer surface of the base body 21 on a distal end side and disposed on a front side of the fixed member 1 (side facing the movable member 5), and a rotary member mounting portion 25 provided on a side opposite to the base body 21 via the flange portion 23 and having the rotary member 60 mounted thereon.

The base body 21 has a pair of side walls 21*a*, 21*a* facing each other and a pair of side walls 21*b*, 21*b* facing each other perpendicularly to the pair of side walls 21*a*. 21*a*. Outer surfaces of the side walls 21*a*. 21*a* are flat surfaces parallel to each other. An outer surface of each side wall 21*b* is curved to fit an inner surface of the fixing hole 3.

Furthermore, a pair of locking pieces 29, 29 extending obliquely outward toward the flange portion 23 in an anchor shape extend from proximal end sides (end sides having bottom) of the side walls 21*a*, which are the outer surfaces of the pair of the side walls 21*a*, 21*a*. A stepped locking step portion 29*a* is formed on an outer surface of each locking piece 29 on a distal end side in an extending direction. As shown in FIG. 13, the locking step portions 29*a*, 29*a* of the pair of locking pieces 29, 29 are locked to a peripheral edge on a back side of the fixing hole 3, so that the base member 20 is fixed to the fixing hole 3.

A shaft housing portion 27 that houses and holds the shaft member 50 so as to be ascendable and descendable is formed inside the base member 20 in a height direction of the base member 20 (direction along an axial direction of the shaft member 50) across the base body 21, the flange portion 23, and the rotary member mounting portion 25. The shaft housing portion 27 has a pair of flat inner surfaces 27*a*, 27*a* arranged parallel to each other at positions corresponding to the pair of side walls 21*a*, 21*a* of the base body 21. By these inner surfaces 27*a*, 27*a*, the shaft member 50 is housed in the base member 20 in a state where rotation of the shaft member 50 is restricted (details will be described in the description of the shaft member 50). Groove-shaped concave portions 27*b* and 27*b* extending along the height direction of the base member 20 are formed in inner surfaces of the shaft housing portion 27 at positions corresponding to the pair of side walls 21*b*, 21*b* of the base body 21. A threaded groove portion including a plurality of teeth 57 and locking pawls 55 of the shaft member 50, which will be described later, are movably inserted into these concave portions 27*b*, 27*b* (see FIGS. 14, 16, and 18).

As shown in FIG. 3, a shaft locking hole 28 is formed in each concave portion 27*b* on an upper opening side of the shaft housing portion 27. The shaft locking hole 28 is provided through the rotary member mounting portion 25 in a radial direction. As shown in FIG. 14, the pair of locking pawls 55, 55, which will be described later, of the shaft member 50 are locked in the pair of shaft locking holes 28, 28, so that the shaft member 50 is retained to the base member 20 without coming off.

Figure 4:
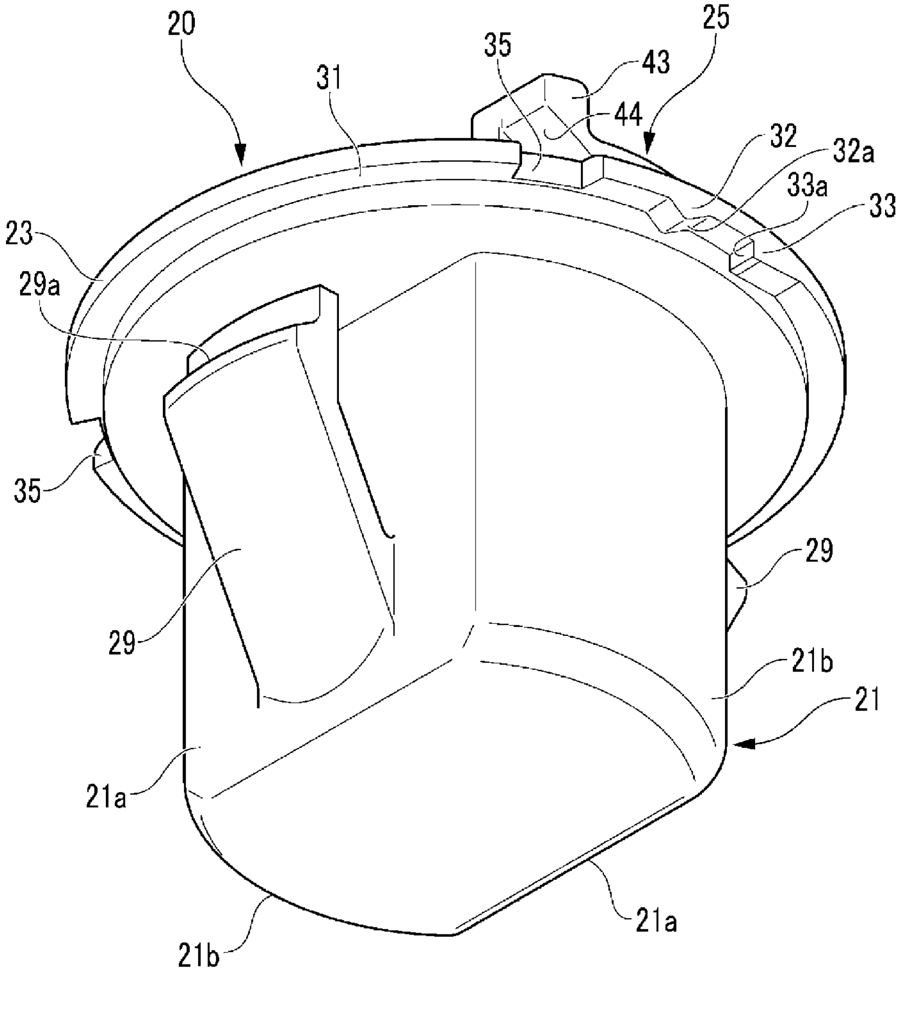
FIG. 4 is an enlarged perspective view of a base portion member constituting the stopper device viewed from a direction different from that in FIG. 3.
Figure 7:
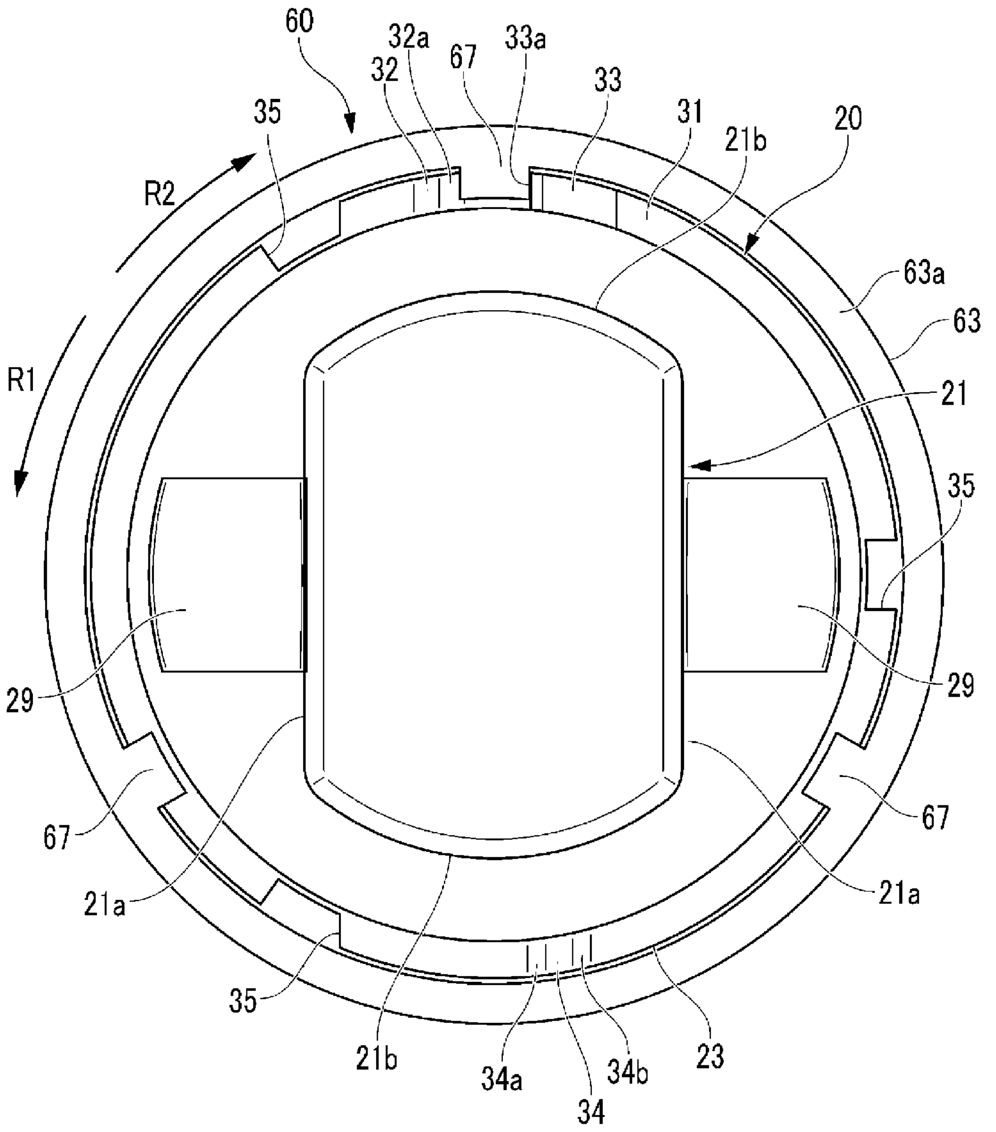
FIG. 7 is a bottom view of the stopper device before causing the rotary member to rotate with respect to a base member for ascending a shaft member.

Further, as shown in FIG. 4, a stepped portion 31 is formed on an outer peripheral edge of the flange portion 23 on the back side (side close to the fixed member 1). Referring also to FIG. 7, a pair of protrusions 32, 33 protrude from the stepped portion 31 at a position aligned with one side wall 21*b* of the base body 21. A tapered surface 32*a* is formed on one side surface of the protrusion 32, a rotation restricted surface 33*a* standing upright with respect to a surface direction of the flange portion 23 is formed on one side surface (side surface facing the tapered surface 32*a*) of the protrusion 33 (see FIG. 4). Furthermore, as shown in FIG. 7, a protrusion 34 protrudes from the stepped portion 31 at a position aligned with the other side wall 21*b* of the base body 21. Tapered surfaces 34*a* and 34*b* are formed on both side surfaces of the protrusion 34 (see FIG. 7).

Figure 8:
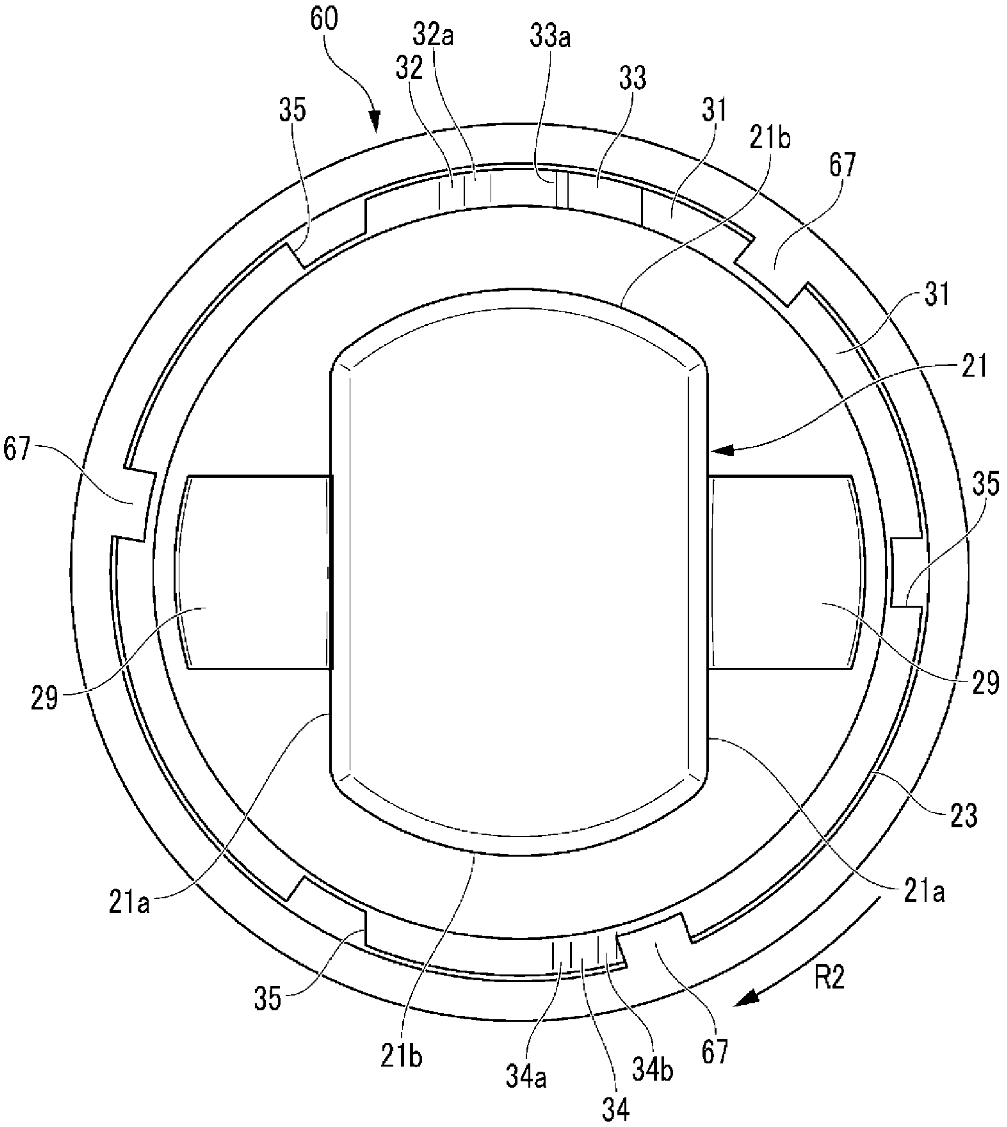
FIG. 8 is a bottom view of a state after causing the rotary member to rotate with respect to the base member in order to ascend the shaft member from the state in FIG. 7.

As shown in FIGS. 7 and 8, a plurality of retaining protrusions 67 of the rotary member 60, which will be described later, are slidably engaged with the stepped portion 31 described above, and the rotary member 60 is rotatably retained with respect to the base member 20, and a relationship between the retaining protrusions 67 and the above protrusions 32, 33, 34 changes, which will be described in detail in the description of the rotary member 60.

As shown in FIGS. 3, 4, and 7, the outer peripheral edge of the flange portion 23 is formed with a plurality of notches 35 (three here) at equal intervals in a circumferential direction. Each notch 35 allows the corresponding retaining protrusion 67 of the rotary member 60 to pass through when the rotary member 60 is mounted to the base member 20.

As shown in FIG. 3, the rotary member mounting portion 25 has a circular outer periphery, and a cylindrical wall 61 (see FIG. 1), which will be described later, of the rotary member 60 is disposed around the outer periphery. A predetermined portion of the outer periphery of the rotary member mounting portion 25 is hollowed out in a predetermined range radially inward of the rotary member mounting portion 25, and a gear disposing portion 37 in which the gear member 80 is disposed is provided. As shown in FIG. 10, the gear disposing portion 37 is disposed with the gear member 80 before the rotary member 60 is rotated in the R1 direction so as to ascend the shaft member 50. When the gear member 80 is disposed in the gear disposing portion 37, an outer peripheral surface of the rotary member mounting portion 25 and an outer peripheral surface of the gear member 80 are substantially flush with each other.

Further, the cam slope 39 is formed at a portion of the rotary member mounting portion 25 located on a rotation direction R1 side of the gear disposing portion 37 (see FIG. 3). The cam slope 39 has a shape protruding in a manner of gradually ascending with respect to a surface of the flange portion 23 along the rotation direction R1. When the rotary member 60 is rotated in the R1 direction with the gear member 80 disposed in the gear disposing portion 37, the gear member 80 is ascended by the cam slope 39 (see FIGS. 10 and 11).

A gear riding surface 41 having a constant height from the surface of the flange portion 23 is formed at a position, adjacent to a top portion 39*a* of the cam slope 39, of the rotary member mounting portion 25. A height of the ascended gear member 80 is maintained by the gear riding surface 41 (see FIG. 11). A tapered gear abutting surface 41*a* is formed at one end portion in the circumferential direction (end portion in the R1 direction side) of the gear riding surface 41 (see FIG. 3), and the cam abutting portion 89*a* of the gear member 80 abuts on the gear abutting surface 41*a*, thereby positioning the gear member 80 in the ascended state. As shown in FIG. 3, a pair of protrusions 40, 40 protrude from inner peripheral edges of the cam slope 39 and the gear riding surface 41 with the concave portion 27*b* interposed therebetween.

Furthermore, as shown in FIGS. 3 and 11, a gear descending protrusion 43 is provided at a position of the rotary member mounting portion 25 on a return direction R2 side of the gear disposing portion 37 and higher than a ceiling surface 25*a* of the rotary member mounting portion 25. A gear abutting surface 44 gradually reducing a gap with respect to the surface of the flange portion 23 in the return direction R2 is formed on a lower surface (surface on a flange portion 23 side) of the gear descending protrusion 43. When the rotary member 60 is rotated in the R2 direction in FIG. 11 with the ascended gear member 80 riding on the gear riding surface 41, after the gear member 80 abuts on the gear descending protrusion 43, the gear member 80 is descended by the gear abutting surface 44. As shown in FIG. 10, the gear abutting surface 44 faces an inclined surface 93, which will be described later, of the gear member 80 before the rotary member 60 is rotated in the R1 direction, thereby restricting the rotation of the rotary member 60 in the R2 direction.

Next, the shaft member 50 will be described.

The shaft member 50 includes the abutting portion 54 at a distal end portion 53, and the plurality of teeth 57 that mesh with the gear member 80 are formed in a predetermined range in the circumferential direction of an outer peripheral surface, in the axial direction. More specifically, the shaft member 50 according to the present embodiment has a substantially cylindrical shaft portion 51 extending over a predetermined length. The distal end portion 53 (end portion away from the fixed member 1) in the axial direction of the shaft portion 51 has a substantially disc shape. The abutting portion 54 made of an elastic member such as rubber is mounted to an outer periphery of the distal end portion 53. The abutting portion 54 has a ceiling plate on the top, a peripheral wall extending vertically from a peripheral edge of the ceiling plate, and a substantially cap shape with an opening at the bottom. A proximal end portion in the axial direction of the peripheral wall of the abutting portion 54 is referred to as a proximal end portion 54*a*.

The shaft portion 51 has a pair of side walls 51*a*, 51*a* facing each other and a pair of side walls 51*b*, 51*b* facing each other perpendicularly to the pair of side walls 51*a*, 51*a*. Outer surfaces of the side walls 51*a*, 51*a* are flat surfaces parallel to each other. Each side wall 51*b* has a curved outer surface. The shaft portion 51 is housed in the base member 20 with the pair of side walls 51*a*, 51*a* aligned with the pair of inner surfaces 27*a*, 27*a* of the shaft housing portion 27. As a result, the rotation of the shaft member 50 is restricted with respect to the base member 20.

Further, the flexibly deformable locking pawl 55 is formed on a proximal end side (end side close to the fixed member 1) in the axial direction of each side wall 51*b* of the shaft portion 51 via a substantially U-shaped slit 55*a*. The plurality of teeth 57 extending along the circumferential direction of the side wall 51*b* are formed between the distal end portion 53 and the locking pawl 55 on the outer peripheral surface of each side wall 51*b* of the shaft portion 51 at predetermined intervals along the axial direction of the side wall 51*b*, and threaded groove portions are provided.

The threaded groove portions including these locking pawls 55 and the plurality of teeth 57 are disposed in the pair of concave portions 27*b*, 27*b* of the shaft housing portion 27 when the shaft member 50 is housed in the base member 20. As shown in FIG. 13, by respectively locking the pair of locking pawls 55, 55 to the pair of shaft locking holes 28, 28 of the base member 20, the shaft member 50 is retained with respect to the base member 20 and the abutting portion 54 is regulated so as not to protrude further from the base member 20.

Next, the rotary member 60 will be described.

Figure 5:
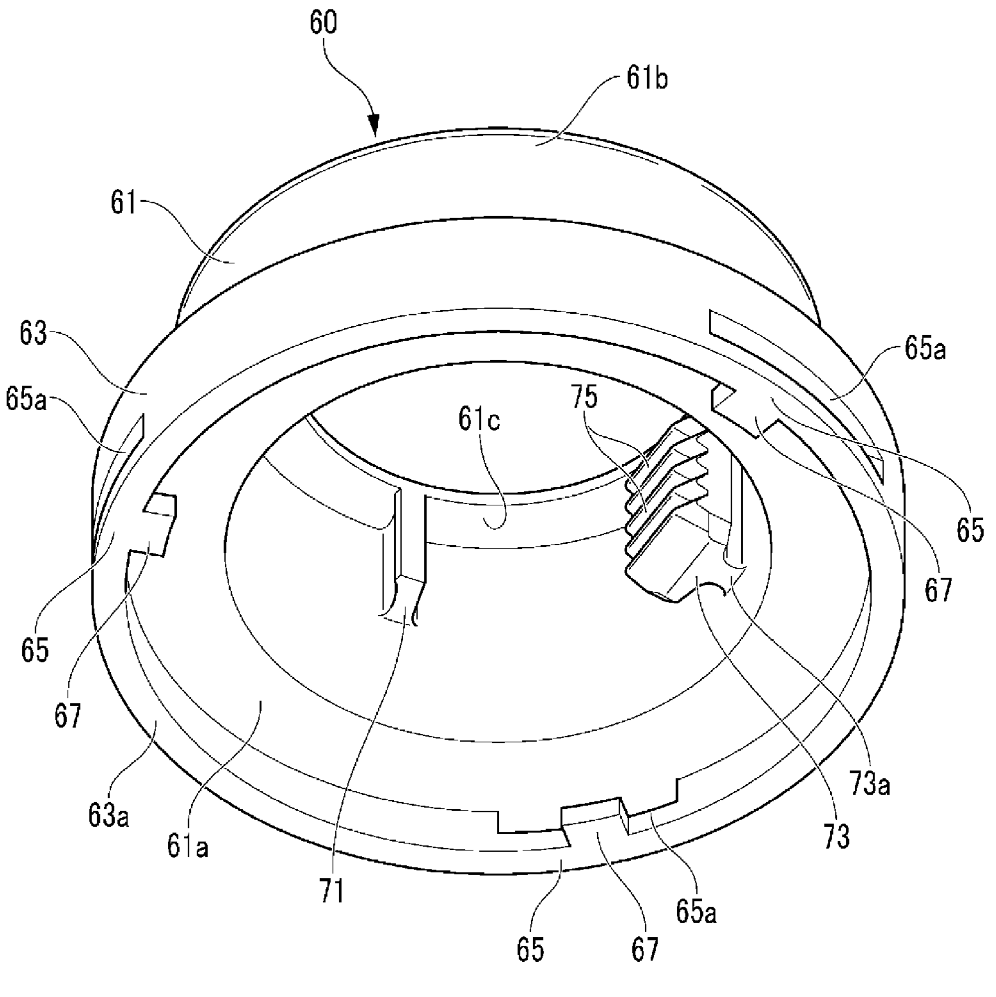
FIG. 5 is an enlarged perspective view of a rotary member constituting the stopper device viewed from a direction different from that in FIG. 1.

As shown in FIGS. 1 and 5, the rotary member 60 according to the present embodiment includes the cylindrical wall 61 having a substantially cylindrical shape, and a gripping portion 63 concentrically disposed outside a proximal end portion 61*a* (end portion close to the fixed member 1) of the cylindrical wall 61 and having a circular outer periphery. A concave groove-shaped cushion housing portion 64 having a mortar-shaped slope on an inner peripheral surface is formed between the proximal end portion 61*a* of the cylindrical wall 61 and the gripping portion 63 (see FIGS. 1 and 13).

The gripping portion 63 is a portion gripped by an operator when causing the rotary member 60 to rotate. An annular rib 61*c* having an annular thin rib shape is provided on an inner periphery of a distal end portion 61*b* (end portion away from the fixed member 1) of the cylindrical wall 61. The annular rib 61*c* is disposed above the gear member 80 housed in the rotary member 60, suppresses the gear member 80 from coming off from an upper opening side of the rotary member 60, and abuts on the distal end portion 53 to restrict the shaft member 50 from being pushed in when the shaft member 50 is pushed to the maximum (see FIGS. 15 and 16).

An inner diameter of the cylindrical wall 61 substantially matches an outer diameter of the rotary member mounting portion 25 of the base member 20, so that a rotation motion of the cylindrical wall 61 disposed outside the rotary member mounting portion 25 is guided. An inner diameter of the gripping portion 63 substantially matches an outer diameter of the flange portion 23 of the base member 20, so that a rotation motion of the gripping portion 63 disposed outside the flange portion 23 is guided.

Furthermore, in a state where the rotary member 60 is mounted to the base member 20, an end surface of the proximal end portion 61*a* of the cylindrical wall 61 is arranged to face the surface of the flange portion 23 of the base member 20 (see FIG. 13). As a result, the gear member 80 is suppressed from coming off from a lower opening side of the rotary member 60, and a descending motion of the gear member 80 is restricted.

Furthermore, a plurality of slits 65*a* (three here) extending in a predetermined length along the circumferential direction are formed at equal intervals in the circumferential direction of the gripping portion 63 on a proximal end portion 63*a* (end portion close to the fixed member 1) side of the gripping portion 63. Through these slits 65*a*, flexible pieces 65 capable of bending deformation are provided at the proximal end portion 63*a* of the gripping portion 63 (see FIG. 5). From an inner periphery of each flexible piece 65, the tongue retaining protrusion 67 protrudes toward a center of rotation of the rotary member 60. Each retaining protrusion 67 is locked to the stepped portion 31 of the flange portion 23 of the base member 20 so as to be slidably contactable.

When the rotary member 60 is mounted to the base member 20, with the retaining protrusion 67 of the rotary member 60 aligned with each notch 35 of the base member 20, the rotary member 60 is pushed into the base member 20 to allow the retaining protrusions 67 to pass through the corresponding notches 35, and the retaining protrusions 67 are positioned on the stepped portion 31 of the flange portion 23 of the base member 20. After that, by causing the rotary member 60 to rotate in a predetermined direction with respect to the base member 20, each retaining protrusion 67 is engaged with the stepped portion 31 of the flange portion 23, and thus, the rotary member 60 is rotatably mounted to the base member 20 (see FIG. 7).

In this state, even if the rotary member 60 attempts to ascend with respect to the base member 20, since the retaining protrusion 67 of the rotary member 60 is locked and caught by the stepped portion 31 of the base member 20, the rotary member 60 cannot be ascended. On the other hand, even if the rotary member 60 attempts to descend with respect to the base member 20, since the proximal end portion 61*a* of the cylindrical wall 61 of the rotary member 60 abuts on the surface of the flange portion 23 of the base member 20 (see FIG. 13), the rotary member 60 cannot descend. Therefore, the rotary member 60 cannot ascend and descend with respect to the base member 20.

In the state shown in FIG. 7, the rotary member 60 is rotatable in the R1 direction with respect to the base member 20, but is restricted in rotation in the R2 direction. That is, even if the rotary member 60 is to be rotated in the R2 direction in FIG. 7, since the retaining protrusion 67 of the rotary member 60 abuts on the rotation restricted surface 33*a*, the rotary member 60 is restricted in rotation.

On the other hand, when the rotary member 60 is rotated in the R1 direction of FIG. 7, as shown in FIG. 8, the predetermined retaining protrusion 67 can climb over the protrusion 32 via the tapered surface 32*a*, so that the rotary member 60 can rotate in the R1 direction. When the rotary member 60 is rotated in the R1 direction, as shown in FIG. 8, the retaining protrusions 67 other than the retaining protrusion 67 that has climbed over the protrusion 32 climb over the top of the protrusion 34 via one tapered surface 34*a* and abuts on the other tapered surface 34*b*. When the rotary member 60 is rotated in the direction indicated by the arrow R2 from the state shown in FIG. 8, the retaining protrusion 67 of the rotary member 60 can climb over the top of the protrusion 34 via the other tapered surface 34*b*.

Figure 9:
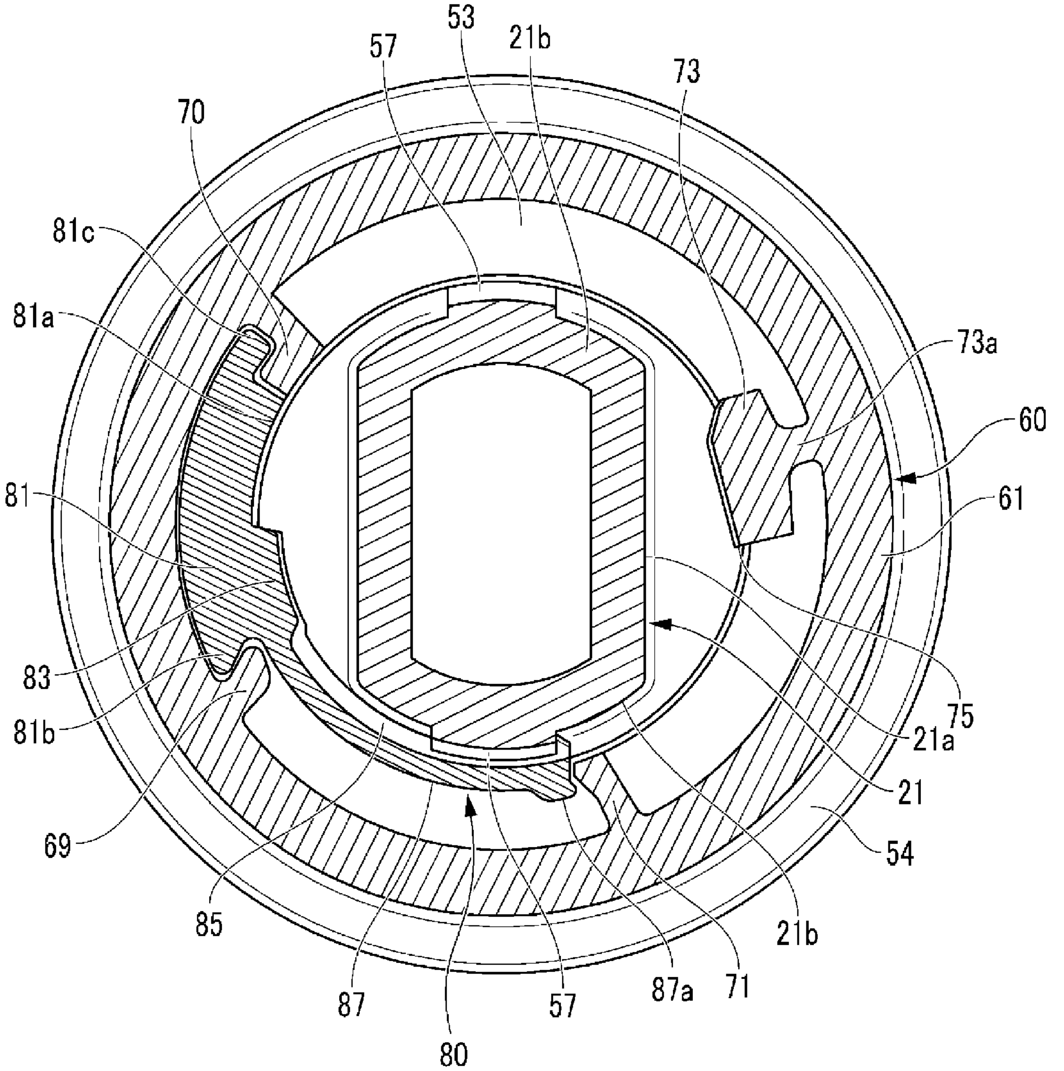
FIG. 9 is a cross-sectional view taken along a line A-A of FIG. 2.

As shown in FIGS. 5 and 9, a plurality of ribs 69, 70, 71 which protrude radially inward of the rotary member 60 and extend along the axial direction of the rotary member 60 are provided at predetermined positions on an inner periphery of the cylindrical wall 61 of the rotary member 60. As shown in FIG. 9, the rib 69 is disposed outside one side portion 81*b* of the base portion 81 of the gear member 80. The rib 70 has a substantially L-shaped cross section and is disposed outside the other side portion 81*c* of the base portion 81 of the gear member 80. Further, the rib 71 is disposed outside an end surface of a distal end portion 87*a* of a first extension portion 87 of the gear member 80. Upper end portions of the ribs 69, 70, 71 are connected to the annular rib 61*c* to improve rigidity.

These ribs 69, 70, 71 restrict the rotation of the gear member 80 with respect to the rotary member 60 and guide the gear member 80 movably in the axial direction of the rotary member 60.

As shown in FIG. 5, a rib 73*a* which protrudes radially inward of the rotary member 60 and extends along the axial direction of the rotary member 60 is provided at a predetermined position on the inner periphery of the cylindrical wall 61 of the rotary member 60, and a plate-shaped portion 73 wider than the rib 73*a* is provided via the rib 73*a*. On an inner surface of the plate-shaped portion 73, a plurality of teeth 75 extending along a circumferential direction (width direction) of the plate-shaped portion 73 are formed at predetermined intervals in an axial direction (height direction) of the plate-shaped portion 73, and a threaded groove portion is provided. Upper end portions of the rib 73*a* and the plate-shaped portion 73 are connected to the annular rib 61*c* to improve rigidity.

Next, the gear member 80 will be described.

This gear member 80 rotates in conjunction with the rotation of the rotary member 60, and causes the shaft member 50 to ascend while maintaining the temporary fixing state of the shaft member 50 by the temporary fixing portion as ascending by the cam mechanism. Further, the gear member 80 includes a permanent fixing portion 83 that restricts an ascending and descending motion of the shaft member 50 in the ascended state.

Figure 6:
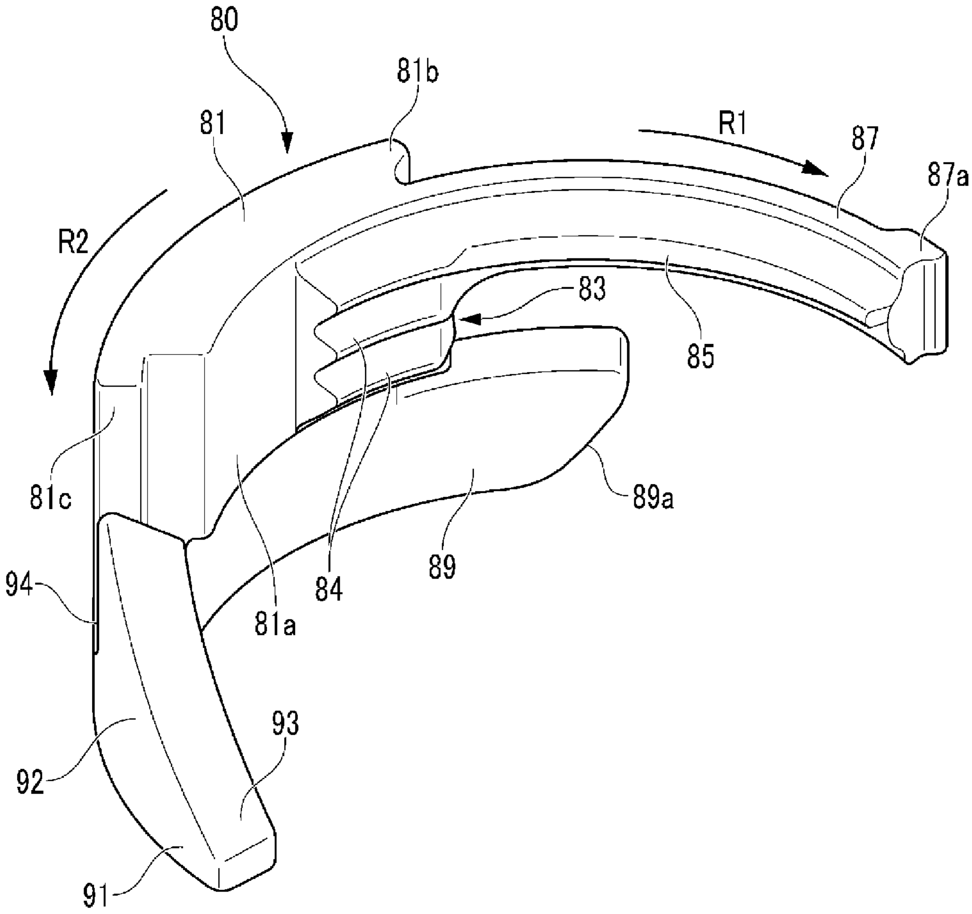
FIG. 6 is an enlarged perspective view of a gear member constituting the stopper device viewed from a direction different from that in FIG. 1.

Referring also to FIG. 6, the gear member 80 according to the present embodiment includes a plate-shaped piece that curves and extends along an inner periphery of the rotary member 60.

That is, the gear member 80 according to the present embodiment includes the plate-shaped piece that curves and extends along the outer periphery of the rotary member mounting portion 25 and the inner periphery of the cylindrical wall 61 with a plate thickness that can be disposed in a gap between the rotary member mounting portion 25 of the base member 20 and the cylindrical wall 61 of the rotary member 60.

More specifically, the gear member 80 includes the long plate-shaped base portion 81 that has a plate thickness that can be housed in the gear disposing portion 37 of the rotary member mounting portion 25, is curved along an inner periphery of the gear disposing portion 37, and extends for a predetermined length.

A protrusion 81*a* protrudes with a predetermined thickness from an inner periphery of the base portion 81 radially inwardly of the rotary member 60 disposed adjacent to the gear member 80. Here, the protrusion 81*a* protrudes from a position other than a proximal end portion side of the base portion 81 (end portion on the fixed member 1 side). One side portion in the circumferential direction of the base portion 81 (R1 direction side portion) is defined as "one side portion 81*b*", and the other side in the circumferential direction (R2 direction side portion) is defined as "other side portion 81*c*".

As shown in FIG. 6, the permanent fixing portion 83 is provided on an inner surface of the protrusion 81*a* and on the one side portion 81*b* side of the base portion 81 in the circumferential direction. The permanent fixing portion 83 extends in the circumferential direction of the protrusion 81*a* and includes a base portion of a ridge portion 85 which will be described later (portion, located on an inner surface of the protrusion 81*a*, of the ridge portion 85 extending over the first extension portion 87) and a plurality of protrusions 84, 84 which are disposed along the axial direction of the protrusion 81*a*. The protrusions 84 and the ridge portion 85 have a substantially mountain shape and can mesh with the teeth 57 of the shaft member 50. The permanent fixing portion 83 is provided on the base portion 81 and the protrusion 81*a*, is thicker than the first extension portion 87 which will be described later, and is a rigid body that does not bend and deform like the first extension portion 87.

Furthermore, the first extension portion 87 extends in the circumferential direction from one side portion of the permanent fixing portion 83. Here, the strip-shaped first extension portion 87 having a narrower width than the permanent fixing portion 83 extends along the rotation direction R1 of the rotary member 60 from one side portion in the circumferential direction of the permanent fixing portion 83. The ridge portion 85 that meshes with the teeth 57 of the shaft member 50 is continuously provided over an inner surface of the first extension portion 87 and an inner surface of the permanent fixing portion 83. Since the strip-shaped first extension portion 87 has a narrower width than the permanent fixing portion 83, the first extension portion 87 is flexurally deformable. The distal end portion 87*a* of the first extension portion 87 in an extending direction is slightly thicker than the other portions.

A strip-shaped second extension portion 89 having a narrower width than the base portion 81 extends along the rotation direction R1 of the rotary member 60 from the proximal end portion side, which is the one side portion 81*b* in the circumferential direction of the base portion 81. A distal end portion in the extending direction of the second extension portion 89 is provided with the cam abutting portion 89*a* which is directed from one end side (side away from the fixed member 1) in the axial direction to the other end side (side close to the fixed member 1) in the axial direction of the gear member 80 and is inclined toward the R2 direction side.

A strip-shaped third extension portion 91 having a narrower width than the base portion 81 extends along the return direction R2 of the rotary member 60 from the proximal end portion side, which is the other side portion 81*c* in the circumferential direction of the base portion 81. A protrusion piece 92 protrudes from one end portion in the axial direction of the gear member 80, which is the distal end portion in the extending direction of the third extension portion 91. Furthermore, an inclined surface 93 is formed, which is inclined over a distal end in the extending direction of the third extension portion 91 and a distal end surface of the protrusion piece 92 on the R2 direction side, and from one end side in the axial direction to the other end side in the axial direction of the gear member 80 and toward the R2 direction side. A guide groove 94 extending with a constant width along the axial direction of the gear member 80 is formed between the other side portion 81*c* of the base portion 81 and the protrusion piece 92 (see FIGS. 10 and 11).

As shown in FIG. 9, in a state where the gear member 80 is disposed inside the rotary member 60, the rib 69 of the rotary member 60 is engaged with the outside of the one side portion 81*b* of the base portion 81, the rib 70 of the rotary member 60 is engaged with the outside of the other side portion 81*c* of the base portion 81, and the rib 71 of the rotary member 60 is engaged with the outside of the end surface of the distal end portion 87*a* of the first extension portion 87. The rib 70 of the rotary member 60 is inserted into the guide groove 94 of the gear member 80.

As a result, in the rotary member 60, the gear member 80 is suppressed from moving radially inward and outward of the rotary member 60 (suppressed from moving radially inward by the ribs 69, 70, 71 and suppressed from moving radially outward by the cylindrical wall 61), the gear member 80 is suppressed from moving in the circumferential direction by the ribs 69, 70, 71, and the ascending and descending motion of the gear member 80 along the axial direction of the rotary member 60 is guided by the ribs 69, 70, 71. The gear member 80 is suppressed from moving in the circumferential direction by the ribs 69, 70, 71, so that the gear member 80 also rotates in conjunction with the rotation of the rotary member 60 (the gear member 80 rotates together with the rotation of the rotary member 60).

The cam abutting portion 89*a* described above abuts on the cam slope 39 of the base member 20 to cause the gear member 80 to ascend when the rotary member 60 is rotated in the R1 direction. That is, as shown in FIG. 10, in a state w % here the gear member 80 is housed and held in the gear disposing portion 37 of the rotary member mounting portion 25 of the base member 20, when the rotary member 60 is rotated in the R1 direction, the gear member 80 is also rotated in conjunction therewith, and the cam abutting portion 89*a* abuts on the cam slope 39 of the base member 20 and is pushed up, and thus, the gear member 80 ascends in the rotary member 60 while being guided by the ribs 69, 70, 71, and rides on the gear riding surface 41 as shown in FIG. 11.

That is, the cam abutting portion 89*a* and the cam slope 39 constitute the "cam mechanism" of the present invention.

As shown in FIG. 11, in a state where the ascended gear member 80 rides on the gear riding surface 41 of the base member 20, when the rotary member 60 is rotated in the R2 direction (that is, rotated in the direction opposite to that when the gear member 80 is ascended), the inclined surface 93 of the gear member 80 abuts on the gear descending protrusion 43 of the base member 20, and then a force is applied from the gear abutting surface 44 of the base member 20 to the inclined surface 93 to push down the gear member 80, and as a result, the gear member 80 is rotated in the R2 direction and descended, and as shown in FIG. 10, the gear member 80 is housed in the gear disposing portion 37 and the protrusion piece 92 of the gear member 80 slips under the gear abutting surface 44, so that the gear member 80 returns to the initial position shown in FIG. 10.

That is, the gear descending protrusion 43 and gear abutting surface 44 of the base member 20 and the inclined surface 93 of the gear member 80 form the "structure for causing the ascended gear member to descend" in the present invention.

FIG. 12 shows a relationship between the shaft member 50 and the gear member 80.

A left figure of FIG. 12 corresponds to FIGS. 13 and 14, and the shaft member 50 is not pushed into the base member 20. In this state, the teeth 57 on a proximal end side in the axial direction of the shaft member 50 are meshed with the ridge portion 85 on the inner surface of the first extension portion 87 of the gear member 80 (see FIG. 14), and the gear member 80 is temporarily fixed to the shaft member 50 in a manner that the abutting portion 54 is farthest from the fixed member 1 among three modes shown in FIG. 12 (see FIG. 14). Accordingly, in the present embodiment, the teeth 57 of the shaft member 50 and the ridge portion 85 on the inner surface of the first extension portion 87 of the gear member 80 constitute the "temporary fixing portion" of the present invention.

Figure 15:
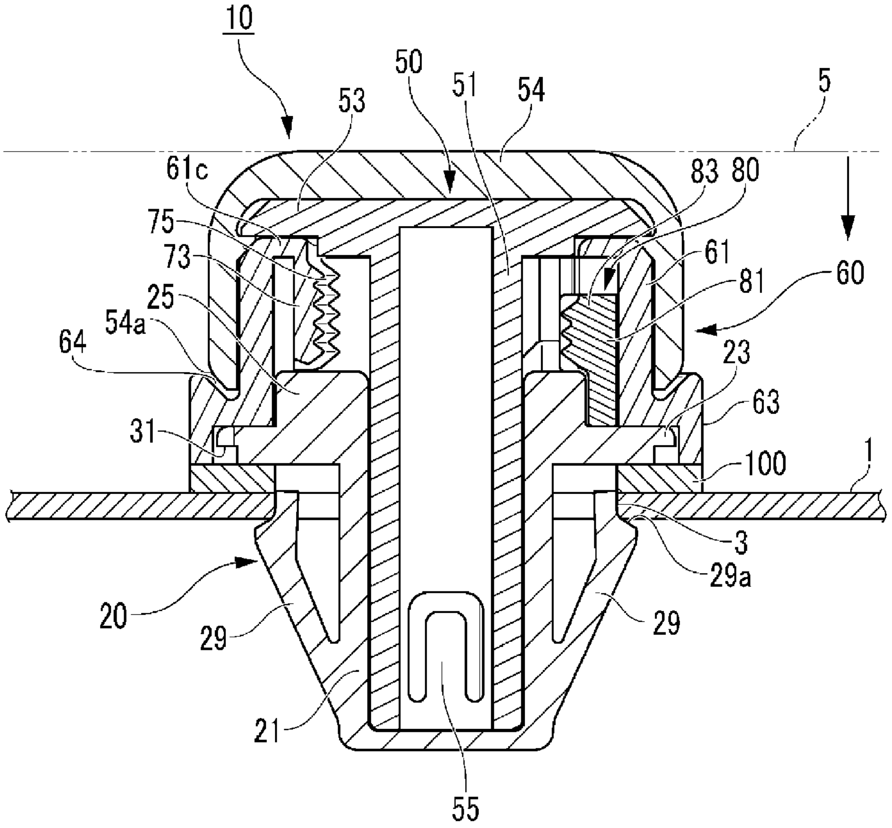
FIG. 15 is a cross-sectional view when the shaft member is pushed in from the state shown in FIG. 13.
Figure 16:
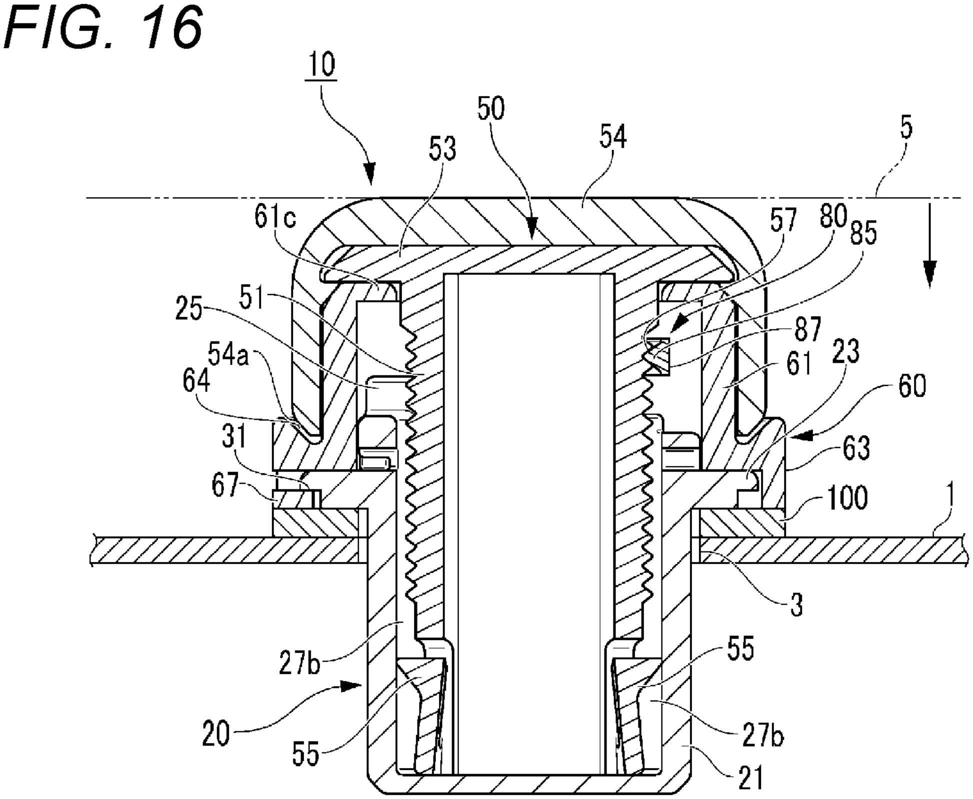
FIG. 16 is a cross-sectional view when the shaft member is pushed in from the state shown in FIG. 14.

A central figure of FIG. 12 corresponds to FIGS. 15 and 16, and the shaft member 50 is pushed into the base member 20 from the state in the left of FIG. 12. That is, when the movable member 5 moves in a direction close to the fixed member 1 (see movable member 5 in FIGS. 13 and 14), the shaft member 50 is pushed in via the abutting portion 54. In this case, the teeth 57 of the shaft member 50 push the ridge portion 85 on the inner surface of the first extension portion 87 of the gear member 80, the first extension portion 87 is flexurally deformed, and the shaft member 50 is pushed in and descends while the ridge portion 85 meshes with the teeth 57 step by step (can be said as ratchet engagement). That is, while maintaining the temporary fixing state between the shaft member 50 and the gear member 80 by the temporary fixing portion, the shaft member 50 is pushed in and descended, and finally the ridge portion 85 meshes with the teeth 57 on a distal end side in the axial direction of the shaft member 50 (see FIG. 16), and the abutting portion 54 comes to a position close to the fixed member 1 (see FIGS. 15 and 16).

In the present invention, a term "temporarily fixing the gear member to the shaft member" means that when the abutting portion is pushed by a pressing force of a predetermined value or more, the fixing state between the shaft member and the gear member is released, the shaft member is drawn into the base member, and a height of the abutting portion with respect to the fixed member or the movable member is lowered, whereas when the abutting portion is pressed by a pressing force less than the predetermined value, the fixing state of the shaft member and the gear member is maintained, the shaft member is not drawn into the base member, and the height of the abutting portion with respect to the fixed member or the movable member is maintained.

Figure 17:
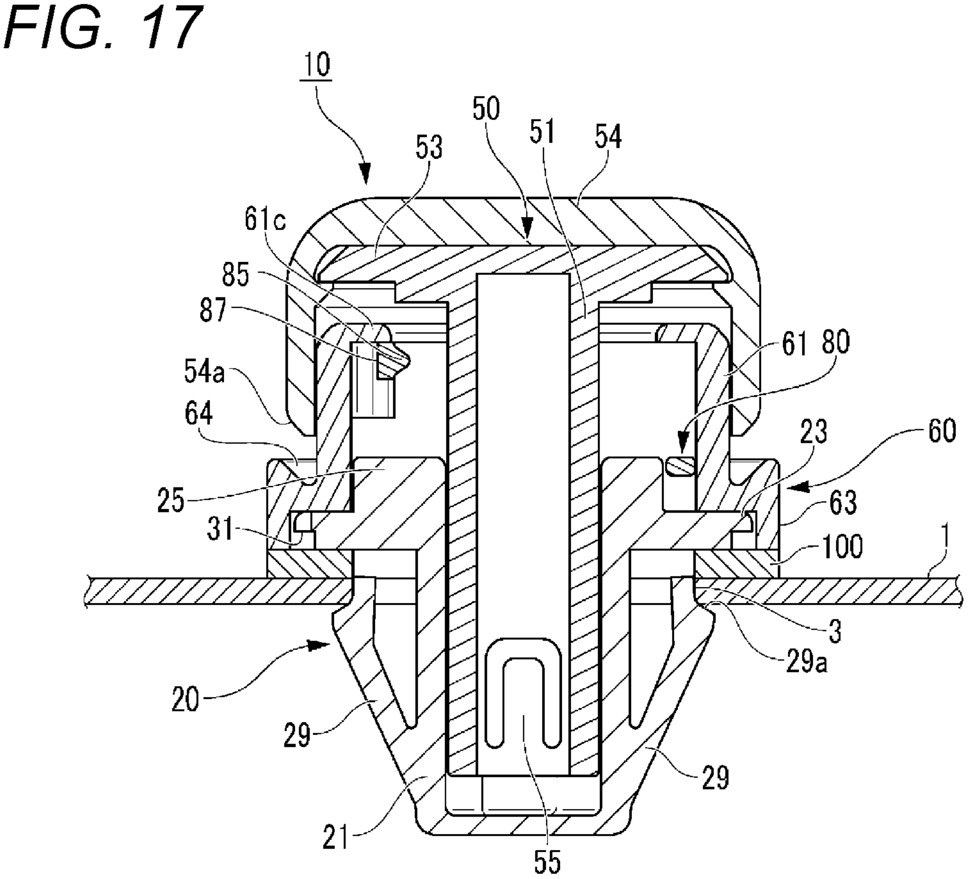
FIG. 17 is a cross-sectional view when the shaft member ascends from the state shown in FIG. 15.
Figure 18:
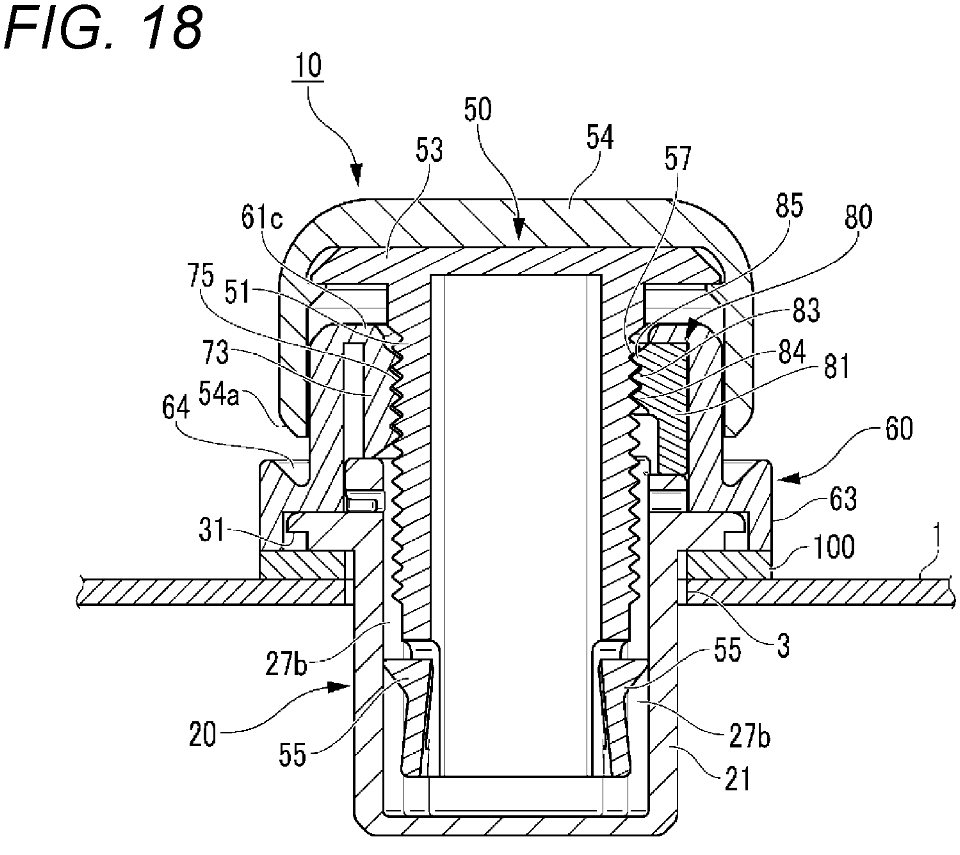
FIG. 18 is a cross-sectional view when the shaft member ascends from the state shown in FIG. 16.

A right figure of FIG. 12 corresponds to FIGS. 17 and 18, and the rotary member 60 is rotated in the R1 direction with respect to the base member 20 from the state in the center of FIG. 12. That is, when the rotary member 60 is rotated in the R1 direction from the state in the center of FIG. 12, the gear member 80 rotates in the R1 direction in conjunction therewith, and the permanent fixing portion 83 is fixed to the shaft member 50 while the shaft member 50 is being ascended, and the ascending and descending motion of the shaft member 50 in the ascended state is restricted.

In the case according to the present embodiment, when the rotary member 60 is rotated in the R1 direction with respect to the base member 20 from the state in the center of FIG. 12, the gear member 80 rotated in conjunction with the rotary member 60 is ascended by the cam mechanism described above. Then, the ridge portion 85 on the inner surface of the first extension portion 87, which meshes with the teeth 57 of the shaft member 50, moves in the circumferential direction inside the threaded groove teeth 57, and the ridge portion 85 pushes up the inner surface of the teeth 57, therefore the shaft member 50 ascends. When the rotary member 60 is further rotated in the R1 direction, the ridge portion 85 on the inner surface of the permanent fixing portion 83 meshes with the teeth 57 of the shaft member 50 while being guided by the ridge portion 85 on the inner surface of the first extension portion 87, and the plurality of protrusions on the inner surface of the permanent fixing portion 83 mesh with the teeth 57 of the shaft member 50 (see FIG. 18), and the permanent fixing portion 83 moves so as to cover the outer side of the plurality of teeth 57 (see the right figure of FIG. 12). As a result, as shown in the right figure of FIG. 12, in a state where the shaft member 50 slightly ascends from the state in the center of FIG. 12, the permanent fixing portion 83 restricts the ascending and descending motion of the ascended shaft member 50, and the abutting portion 54 is fixed such that a protrusion amount of the abutting portion 54 with respect to the fixed member 1 does not vary.

There are no particular restrictions on shapes and structures of the base member, the shaft member, the rotary member, the gear member, the temporary fixing portion, the cam mechanism, the ascending and descending structure of the shaft member by the gear member, the permanent fixing portion of the gear member, the gear member descending structure for descending the ascended gear member, and the like which constitute the stopper device described above. In the above embodiment, the base member 20 is fixed to the fixed member 1 side, but the base member may be fixed to a movable body side.

Furthermore, although the gear member 80 according to the present embodiment includes a plate-shaped piece, the base member 20 is not limited thereto, and it is sufficient if the base member 20 can be disposed inside the rotary member in the rotation restricted state. In the present embodiment, although the temporary fixing portion includes the plurality of teeth 57 of the shaft member 50 and the ridge portion 85 of the gear member 80 (the plurality of teeth mesh with a single protrusion), for example, both the shaft member and the gear member may be provided with the plurality of teeth to form a temporary fixing portion by meshing with each other, or the shaft member and the gear member may be provided with protrusions and concaves to provide a temporary fixing portion by meshing the protrusions with the concaves, or the shaft member and the gear member may be formed as the temporary fixing portion by friction, pressure contact, or the like.

The gear member 80 according to the present embodiment has a shape in which the ridge portions 85 are provided continuously over the inner surface of the first extension portion 87 and the inner surface of the permanent fixing portion 83, and has an aspect in which one of the portions constituting the so-called temporary fixing portion and the permanent fixing portion are continuously provided, but the two portions may be provided separately and independently without being provided continuously. Furthermore, the aspect of the permanent fixing portion is not limited to the ridge portion, and it is sufficient if the abutting portion can be fixed such that a protrusion amount, protrusion position, height, and the like of the abutting portion with respect to the fixed member does not vary so that the shaft member cannot be pushed into the base member.

<Operations and Effects>

Next, operations and effects of the stopper device 10 according to the present invention configured as described above will be described.

FIGS. 13 and 14 show a state where the stopper device 10 is attached to the fixed member 1. That is, in a state where the seal ring 100 interposed on the back side of the flange portion 23 of the base member 20, by inserting the base body 21 from a front side of the fixing hole 3 of the fixed member 1, as shown in FIGS. 13 and 14, the seal ring 100 abuts on a peripheral edge on the front side of the fixing hole 3, the locking step portions 29*a*, 29*a* of the pair of locking pieces 29, 29 are engaged with the peripheral edge on the back side of the fixing hole 3, and the base member 20 is fixed to the fixed member 1.

In this state, the teeth 57 on the proximal end side in the axial direction of the shaft member 50 are meshed with the ridge portion 85 on the inner surface of the first extension portion 87 of the gear member 80 (see FIG. 14), and the gear member 80 is temporarily fixed to the shaft member 50 in a state where the abutting portion 54 is away from the fixed member 1 by a predetermined protrusion amount (see FIGS. 13 and 14).

In the above state, when the movable member 5 is moved toward the fixed member 1 (see FIGS. 13 and 14), the shaft member 50 is pushed in via the abutting portion 54, the teeth 57 of the shaft member 50 push the ridge portion 85 on the inner surface of the first extension portion 87 of the gear member 80, the first extension portion 87 is flexurally deformed, and the shaft member 50 descends while the ridge portion 85 meshes with the teeth 57 step by step. The shaft member 50 is pushed in until the distal end portion 53 of the shaft member 50 abuts on the annular rib 61*c* of the rotary member 60, and as shown in FIGS. 15 and 16, the abutting portion 54 comes close to the fixed member 1. As a result, the protrusion amount of the abutting portion 54 with respect to the fixed member 1 is temporarily determined. In a state where the shaft member 50 is pushed in to a maximum extent, the proximal end portion 54*a* of the abutting portion 54 is housed in the cushion housing portion 64 of the rotary member 60 (see FIGS. 15 and 16).

Next, the movable member 5 is moved away from the fixed member 1 so that the shaft member 50 does not receive a load from the movable member 5, and then the rotary member 60 is rotated in the R1 direction with respect to the base member 20. Then, the gear member 80 rotates in the R1 direction in conjunction with the rotary member 60, and the cam abutting portion 89*a* of the gear member 80 abuts on the cam slope 39 of the base member 20, so that the gear member 80 ascends in the rotary member 60 while being guided by the ribs 69, 70, 71, and the ridge portion 85 on the inner surface of the first extension portion 87 causes the shaft member 50 to ascend via the teeth 57. When the rotary member 60 is further rotated in the R1 direction, the ridge portion 85 on the inner surface of the permanent fixing portion 83 meshes with the teeth 57 of the shaft member 50 while being guided by the ridge portion 85 on the inner surface of the first extension portion 87, and the plurality of protrusions on the inner surface of the permanent fixing portion 83 mesh with the teeth 57 of the shaft member 50 (see FIG. 18), and in a state where the shaft member 50 is slightly ascended, the ascending and descending motion of the ascended shaft member 50 is restricted by the permanent fixing portion 83. As a result, the abutting portion 54 can be fixed such that the protrusion amount of the abutting portion 54 with respect to the fixed member 1 does not vary (height of the abutting portion 54 with respect to the fixed member 1 can be fixed).

In the stopper device 10, as described above, in the rotation operation of the rotary member 60, the rotary member 60 itself does not ascend and descend with respect to the base member 20, and only the gear member 80 ascends inside the rotary member 60, and thus, no extra force is applied to an operator during the rotation operation of the rotary member 60, and operability of the rotary member 60 can be improved. That is, even if the gripping portion 63 is gripped and the rotary member 60 is rotated in a predetermined direction, the rotary member 60 only rotates, and the rotary member 60 does not ascend as in the ring in the buffer device of Patent Literature 1, and thus, the operator is not subjected to a pushing force caused by the rotary member 60. As a result, the operator can smoothly rotate the rotary member 60, and the operability can be improved.

Further, the rotary member 60 does not ascend and descend with respect to the base member 20, and only the gear member 80 can ascend inside the rotary member 60 via the cam mechanism, cause the shaft member 50 to ascend, and adjust the protrusion amount of the abutting portion 54 with respect to the fixed member 1, and thus, the stopper device 10 can be made compact in the axial direction.

Furthermore, the stopper device 10 includes the gear member 80 separate from the base member 20, the shaft member 50, and the rotary member 60, the cam mechanism is provided between the gear member 80 and the base member 20, and thus, compared to the buffer device of Patent Literature 1 which has a protrusion piece on a lower end side of the ring, the rotary member 60 can be formed lower, which contributes to making the stopper device 10 compact in the axial direction.

By the way, in a generally known screw-in rubber stopper, the operator properly rotates the stopper to adjust a protrusion amount of a distal end portion of the stopper with respect to the fixed member, and thus, there is a problem in terms of accuracy because variations tend to occur depending on the operator. Furthermore, if the protrusion amount of the distal end portion of the stopper is insufficient or not sufficient, the protrusion amount of the distal end portion of the stopper may be adjusted by opening and closing the vehicle door several times, and the adjustment work is cumbersome.

On the other hand, in the stopper device 10, as described above, the gear member 80 rotates and ascends in conjunction with the rotation of the rotary member 60 to cause the shaft member 50 to ascend, and the ascending and descending motion of the shaft member 50 is restricted by the permanent fixing portion 83, and thus, the protrusion amount of the abutting portion 54 with respect to the fixed member 1 can be adjusted with high accuracy. That is, when the protrusion amount of the abutting portion 54 with respect to the fixed member 1 is set to a desired protrusion amount, for example, by appropriately adjusting a pitch interval of the teeth 57 of the shaft member 50, an ascending amount of the gear member 80 by the cam mechanism, and the like, the protrusion amount of the abutting portion 54 can be kept constant regardless of who rotates the rotary member 60, and the protrusion amount of the abutting portion 54 can be adjusted with high accuracy.

An operation of rotating the rotary member 60 after bringing the movable member 5 close to and moving the movable member 5 away from the fixed member 1 is performed only once, so that the protrusion amount of the abutting portion 54 with respect to the fixed member 1 can be adjusted, and thus, the adjustment work can be easily performed.

Furthermore, in the present embodiment, the gear member 80 includes the plate-shaped piece that curves and extends along the inner periphery of the rotary member 60. According to this aspect, the gear member 80 is disposed along the inner periphery of the rotary member 60, and an outer diameter of the rotary member 60 can be easily reduced, and thus, the stopper device 10 can be made compact in the radial direction.

In the present embodiment, the gear member 80 includes the first extension portion 87 extending in the circumferential direction from one side portion of the permanent fixing portion 83, and the first extension portion 87 is provided with a temporary fixing portion. According to the above aspect, since the temporary fixing portion is provided on the first extension portion 87 extending in the circumferential direction from one side portion of the permanent fixing portion 83, the temporary fixing portion can be easily formed.

Furthermore, in the present embodiment, the plurality of teeth 57 are formed along the axial direction in a predetermined range in the circumferential direction of the outer peripheral surface of the shaft member 50, and the ridge portions 85 that mesh with the teeth 57 of the shaft member 50 are continuously provided over the inner surface of the permanent fixing portion 83 and the inner surface of the first extension portion 87 of the gear member 80.

According to the above aspect, the ridge portions 85 that mesh with the teeth 57 of the shaft member 50 are continuously provided over the inner surface of the permanent fixing portion 83 and the inner surface of the first extension portion 87 of the gear member 80, and thus, the state where the gear member 80 is temporarily fixed to the shaft member 50 by the temporary fixing portion is easily shifted to the state where the shaft member 50 is restricted from ascending by the permanent fixing portion 83.

That is, before the rotation of the rotary member 60, the teeth 57 of the shaft member 50 mesh with the ridge portion 85 on the inner surface of the first extension portion 87, so that the shaft member 50 and the gear member 80 are kept in the temporary fixing state, and when the rotary member 60 is rotated in the R1 direction in this state and the gear member 80 is rotated in conjunction therewith, the ridge portion 85 on the inner surface of the first extension portion 87 that meshes with the teeth 57 of the shaft member 50 rotates, and the ridge portion 85 on the inner surface of the permanent fixing portion 83 meshes with the teeth 57 of the shaft member 50 while being guided by the ridge portion 85. As a result, the meshing state of the ridge portion 85 with the teeth 57 of the shaft member 50 continues without interruption, and the state where the gear member 80 is temporarily fixed to the shaft member 50 can be smoothly shifted to the state where the shaft member 50 is restricted from ascending.

In the present embodiment, a structure that causes the ascended gear member 80 to descend when the rotary member 60 is rotated in the direction opposite to that when the shaft member 50 is ascended (when rotated in the R2 direction) is provided between the base member 20 and the gear member 80.

According to the above aspect, the gear member 80 ascending as shown in FIG. 11 can be descended by the gear member descending structure (see FIG. 10), and the protrusion amount of the abutting portion 54 with respect to the fixed member 1 can be adjusted again.

Another Embodiment of Stopper Device

FIGS. 19 to 22 show another embodiment of the stopper device according to the present invention. The same reference signs are given to substantially the same parts as those in the above embodiment, and the description thereof will be omitted.

A stopper device according to the present embodiment differs from that of the above embodiment mainly in a structure of temporarily fixing a gear member 80A to a shaft member 50A.

Figure 19:
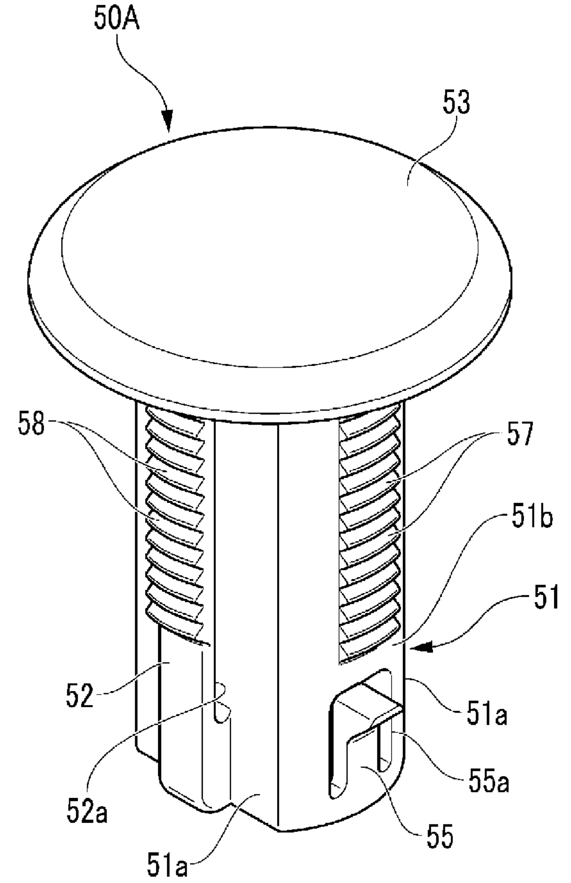
FIG. 19 shows another embodiment of the stopper device according to the present invention, and is an enlarged perspective view of a shaft member constituting the stopper device.
Figure 22:
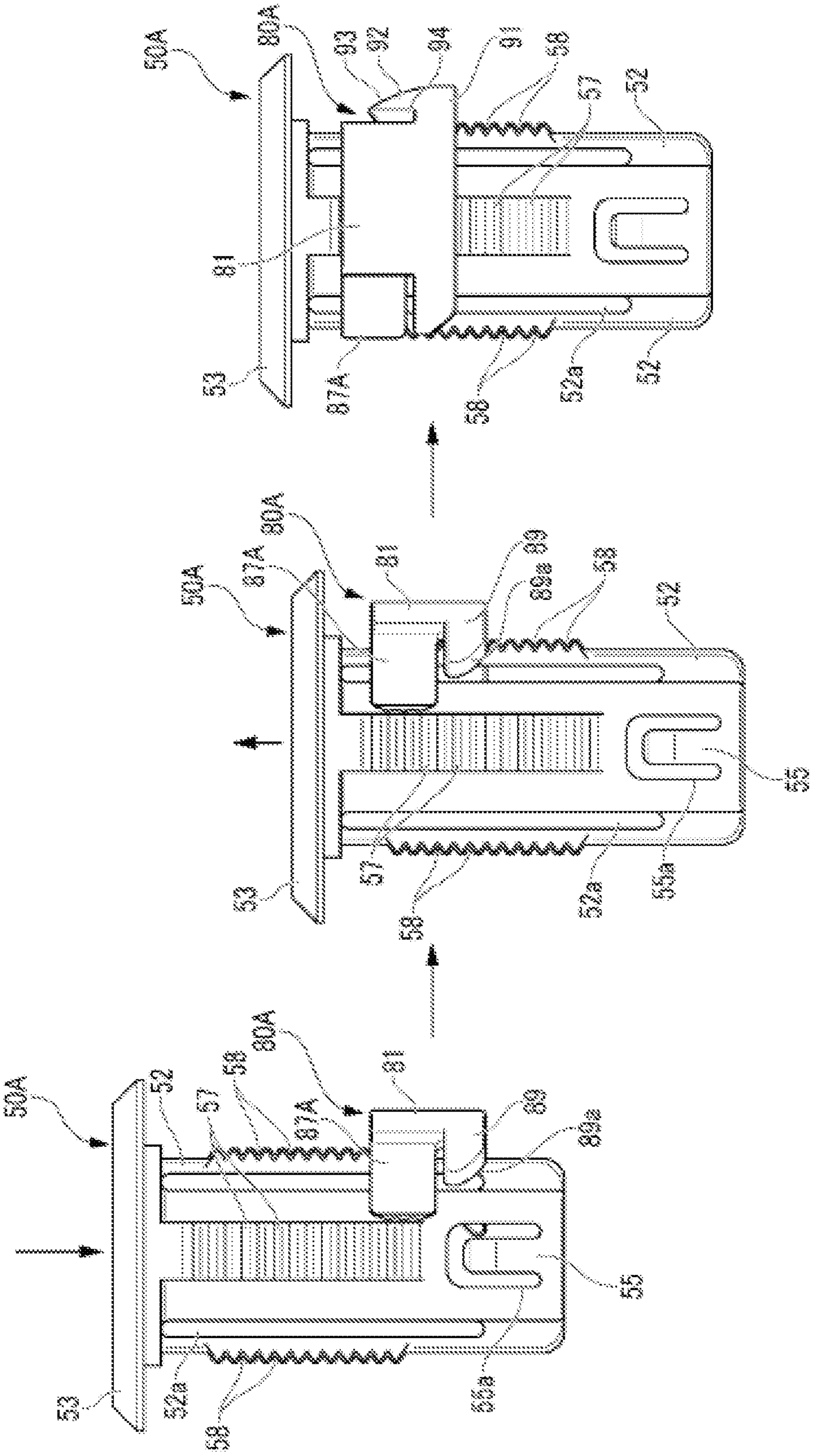
FIG. 22 shows a relationship between the shaft member and the gear member in the stopper device, where a left figure is an explanatory view of a state before the shaft member is pushed in, a central figure is an explanatory view of a state where the shaft member is pushed in and descends, and a right figure is an explanatory view of a state where the shaft member ascends from the state in the central figure.

As shown in FIGS. 19 and 22, flexurally deformable strip-shaped pieces 52 are provided via slits 52*a* on the outer surfaces of the pair of flat side walls 51*a*, 51*a* of the shaft portion 51 of the shaft member 50A. Each strip-shaped piece 52 has a proximal end connected to the proximal end side of the shaft portion 51 and a distal end connected to the back side of the distal end portion 53, and the slit 52*a* is formed on an inner side of the strip-shaped piece 52, so that the strip-shaped piece 52 can be flexurally deformed. A plurality of teeth 58 are formed on an outer surface of the strip-shaped piece 52 along the axial direction.

Figure 20:
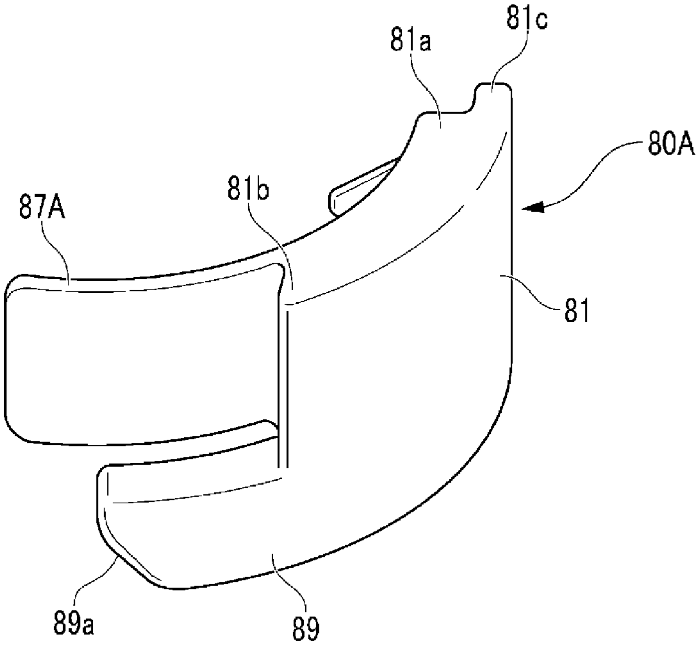
FIG. 20 is an enlarged perspective view of a gear member constituting the stopper device.
Figure 21:
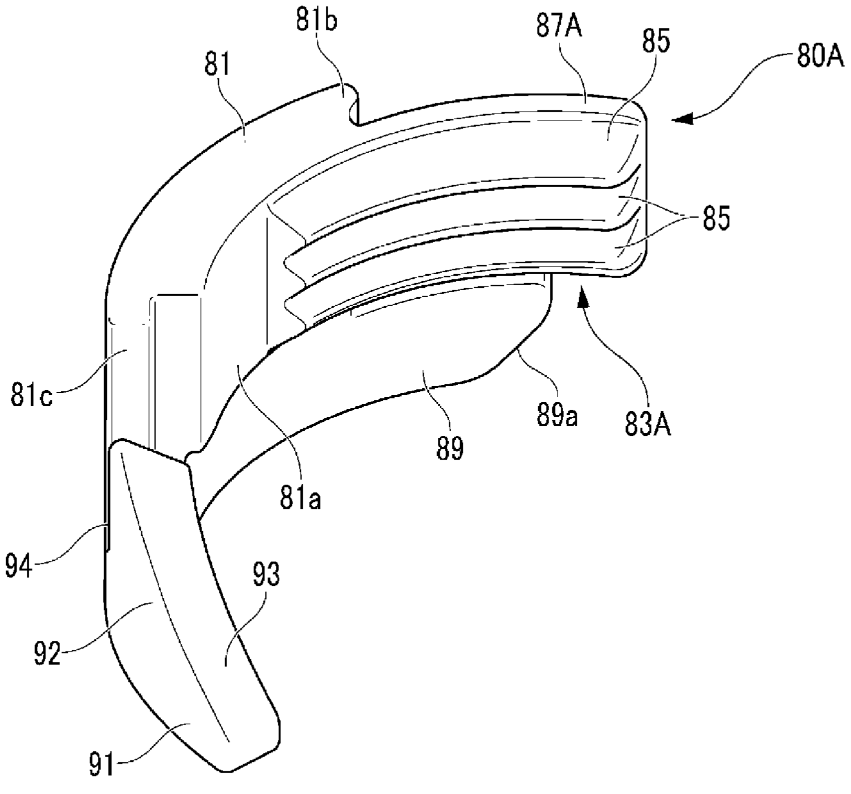
FIG. 21 is an enlarged perspective view of a gear member constituting the stopper device viewed from a direction different from that in FIG. 20.

On the other hand, as shown in FIGS. 20 and 21, in the gear member 80A, a first extension piece 87A extends from one side portion in the circumferential direction of the protrusion 81*a*, the plurality of ridge portions 85 (here, three ridge portions 85 are arranged) extending in a substantially mountain shape are arranged in the axial direction over the inner surface of the protrusion 81*a* on one side portion in the circumferential direction and an inner surface of the first extension piece 87A. The plurality of ridge portions 85 form a permanent fixing portion 83A that does not bend and deform.

A left figure of FIG. 22 shows a state where the shaft member 50 is not pushed into the base member 20. In this state, the plurality of teeth 58 on the outer surface of the strip-shaped piece 52 of the shaft member 50A mesh with the plurality of ridge portions 85 of the gear member 80A, and the gear member 80A is temporarily fixed to the shaft member 50A such that the abutting portion 54 is farthest from the fixed member 1. That is, in the present embodiment, the plurality of teeth 58 of the shaft member 50A and the plurality of ridge portions 85 of the gear member 80A form the "temporary fixing portion" of the present invention.

When the movable member 5 moves in a direction close to the fixed member 1, the shaft member 50A is pushed in via the abutting portion 54. Then, as shown in a central figure of FIG. 22, the plurality of teeth 58 of the shaft member 50A are pressed by the plurality of ridge portions 85 of the gear member 80A, the strip-shaped piece 52 is flexurally deformed, while the plurality of ridge portions 85 mesh with the plurality of teeth 58 step by step, the shaft member 50A is pushed in and descended, and the abutting portion 54 comes to a position close to the fixed member 1.

Then, when the rotary member 60 is rotated in the R1 direction, the gear member 80A rotates in the R1 direction in conjunction therewith, and the permanent fixing portion 83A is fixed to the shaft member 50A while the shaft member 50A is ascended, and an ascending and descending motion of the shaft member 50A in the ascended state is restricted (see a right figure of FIG. 22).

Also in the present embodiment, operations and effects similar to those of the above embodiment can be obtained.

Another Embodiment of Stopper Device

FIGS. 23 to 33 show another embodiment of the stopper device according to the present invention. The same reference signs are given to substantially the same parts as those in the above embodiment, and the description thereof will be omitted.

A stopper device according to the present embodiment differs from that of the above embodiment mainly in a structure of temporarily fixing a gear member 80B to a shaft member 50.

Figure 24:
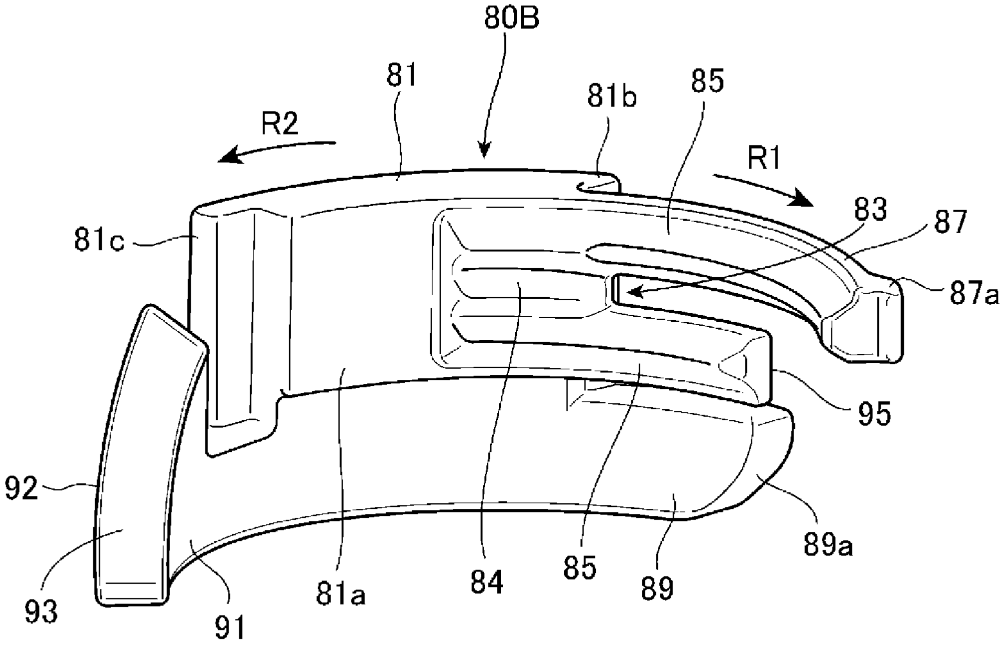
FIG. 24 is an enlarged perspective view of a gear member constituting the stopper device viewed from a direction different from that in FIG. 23.

As shown in FIG. 24, the permanent fixing portion 83 in the gear member 80B according to the present embodiment includes the ridge portions 85 and the protrusions 84 disposed along the axial direction of the protrusion 81*a*. Specifically, the permanent fixing portion 83 includes the ridge portion 85 provided on the distal end side in the axial direction of the protrusion 81*a* (position away from the second extension portion 89), the ridge portion 85 provided on a proximal end side in the axial direction of a protrusion 81*a* (position close to the second extension portion 89), and the protrusion 84 disposed between the ridge portions 85, 85.

In the present embodiment, the temporary fixing portion includes a first temporary fixing portion and a second temporary fixing portion, and a temporary fixing force between the shaft member 50 and the gear member 80B by the second temporary fixing portion is larger than a temporary fixing force between the shaft member 50 and the gear member 80B by the first temporary fixing portion.

In the present invention, the "temporary fixing force between the shaft member and the gear member" means a force that can maintain the fixing state between the shaft member and the gear member and maintain a height of the abutting portion with respect to the fixed member or the movable member when a pressing force less than a predetermined value is applied to the abutting portion, and that can release the fixing state between the shaft member and the gear member and lower the height of the abutting portion with respect to the fixed member or the movable member when the pressing force equal to or greater than the predetermined value is applied to the abutting portion (that is, a force that can withstand the pressing force less than the predetermined value, but cannot withstand the pressing force equal to or greater than the predetermined value).

In the present embodiment, when the rotary member 60 is rotated such that the gear member 80B is ascended by the cam mechanism, a portion forming the permanent fixing portion 83 of the gear member 80B is disposed on the proximal end side in the rotation direction R1, a portion forming the first temporary fixing portion of the gear member 80B is disposed on the distal end side in the rotation direction R1, and a portion forming the second temporary fixing portion of the gear member 80B is disposed between the portion forming the first temporary fixing portion and the portion forming the permanent fixing portion 83.

Figure 23:
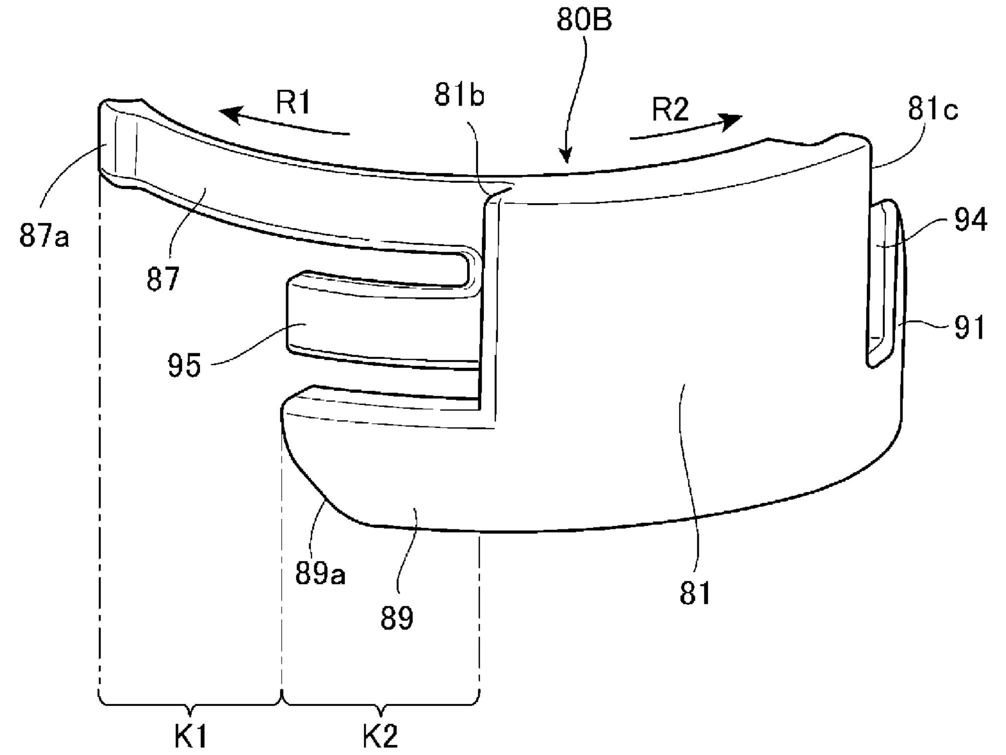
FIG. 23 shows another embodiment of the stopper device according to the present invention, and is an enlarged perspective view of a gear member constituting the stopper device.

Hereinafter, a structure of the temporary fixing portion will be described. As shown in FIGS. 23 and 24, the gear member 80B according to the present embodiment has two extension portions 87, 95 extending in the rotation direction R1 from the one side portion (R1 direction side portion) of the portion forming the permanent fixing portion 83. Here, a fourth extension portion 95 forms the "one extension portion" in the present invention, and the first extension portion 87 forms "the other extension portion" in the present invention. The ridge portion 85 serving as the portion forming the second temporary fixing portion is provided on a proximal end side in the rotation direction R1 of the first extension portion 87 which is the other extension portion, and the ridge portion 85 serving as the portion forming the first temporary fixing portion is provided on the distal end side of the first extension portion 87, which is the other extension portion, further than the fourth extension portion 95 which is the one extension portion. The first extension portion 87 which is the other extension portion extends longer than the fourth extension portion 95 which is the one extension portion.

Specifically, the first extension portion 87 extending along the rotation direction R1 of the rotary member 60 from the distal end side in the axial direction of the protrusion 81*a*, which is one side portion in the circumferential direction of the permanent fixing portion 83, and the fourth extension portion 95 extending along the rotation direction R1 of the rotary member 60 from the proximal end side in the axial direction of the protrusion 81*a*, which is the one side portion in the circumferential direction of the permanent fixing portion 83, are provided. The ridge portions 85, 85 constituting the permanent fixing portion 83 continuously extend in the circumferential direction on the inner surfaces of the extension portions 87, 95.

The ridge portion 85 provided on the inner surface of the first extension portion 87 on the proximal end side in the rotation direction R1 and the ridge portion 85 provided on the inner surface of the fourth extension portion 95 form "the portion forming the second temporary fixing portion of the gear member" in the present invention (portion indicated by a reference sign K2 in FIG. 23). The ridge portion 85 provided on the inner surface on the distal end side in the rotation direction R1 of the first extension portion 87, here, the portion of the first extension portion 87, which is located at the distal end side in the rotation direction R1 further than the fourth extension portion 95, forms "the portion forming the first temporary fixing portion of the gear member" in the present invention (portion indicated by a reference sign K1 in FIG. 23).

The "first temporary fixing portion" in the present invention includes the portion forming the first temporary fixing portion of the gear member and the teeth 57 of the shaft member 50. The "second temporary fixing portion" in the present invention includes the portion forming the second temporary fixing portion of the gear member and the teeth 57 of the shaft member 50.

Figure 25:
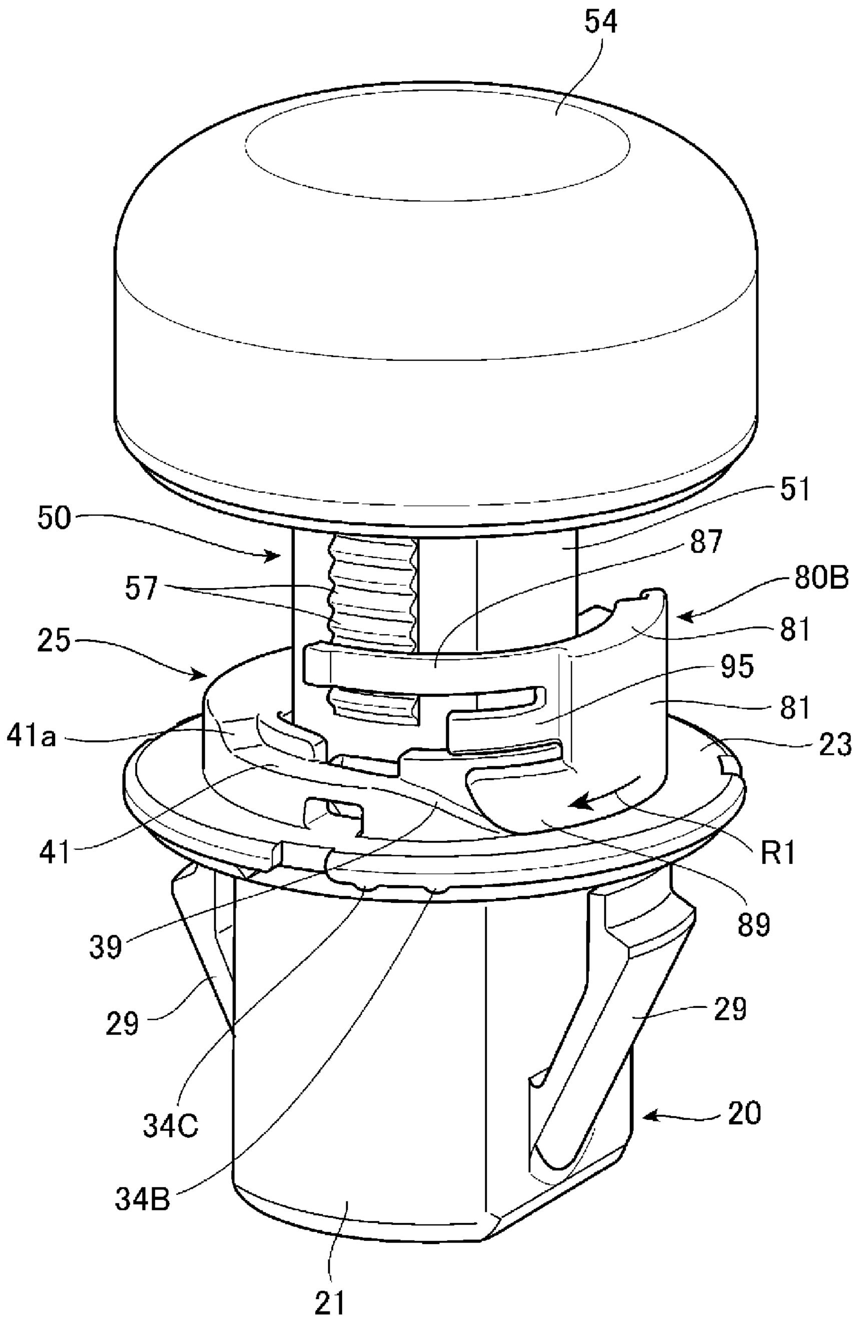
FIG. 25 is a perspective view showing a temporary fixing state between the shaft member and the gear member by a first temporary fixing portion in the stopper device.

In the present embodiment, as described above, the temporary fixing force between the shaft member 50 and the gear member 80B by the second temporary fixing portion is larger than the temporary fixing force between the shaft member 50 and the gear member 80B by the first temporary fixing portion. To describe this configuration in detail, as shown in FIG. 25, a state where the ridge portion 85 on the inner surface of the first extension portion 87 on the distal end side in the rotation direction R1 meshes with the teeth 57 of the shaft member 50 is a temporary fixing state between the shaft member 50 and the gear member 80B by the first temporary fixing portion. In the state shown in FIG. 25, the gear member 80B is disposed on the surface of the flange portion 23 of the base member 20.

Figure 27:
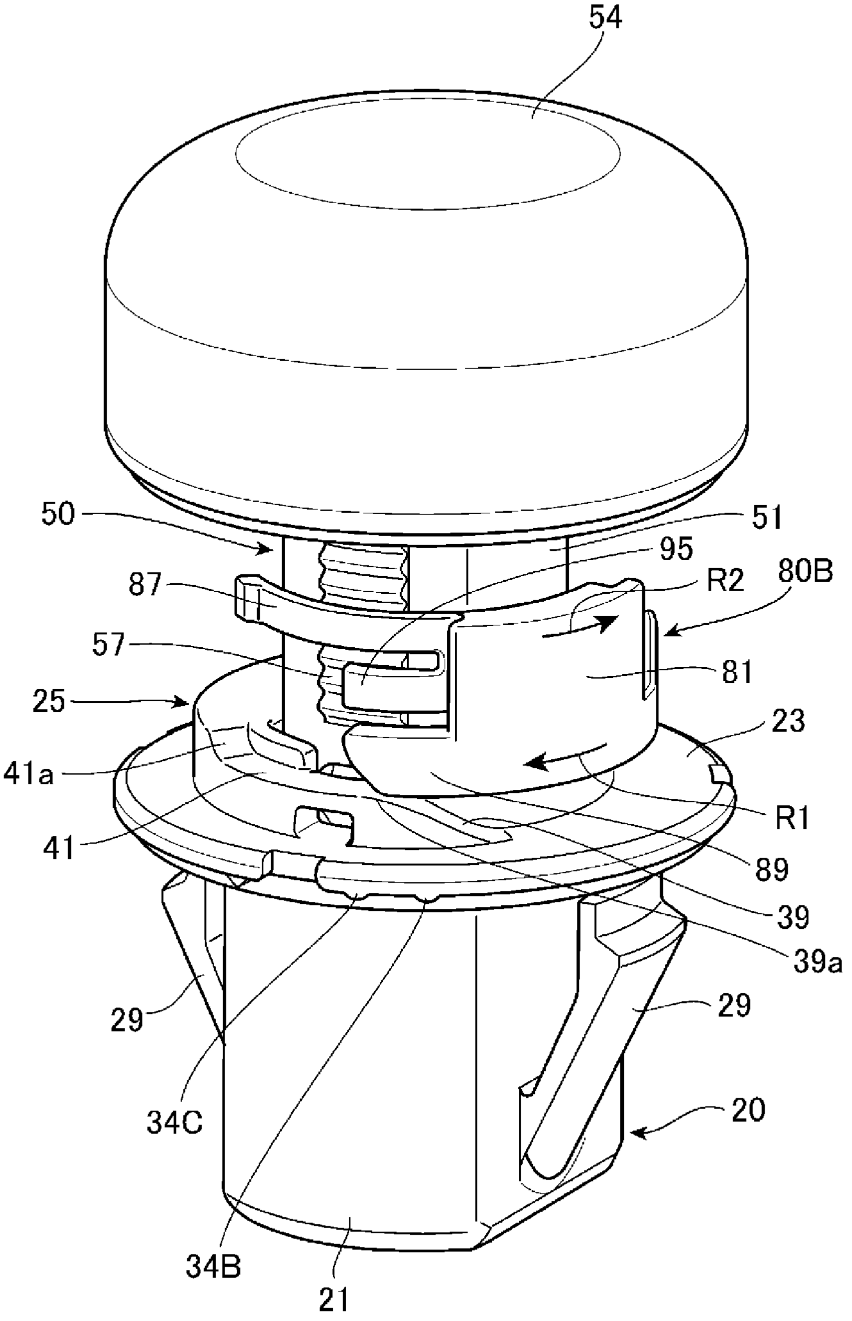
FIG. 27 is a perspective view showing a temporary fixing state between the shaft member and the gear member by a second temporary fixing portion in the stopper device.

When the gear member 80B is rotated in the R1 direction via the rotary member 60 (not shown) from the temporary fixing state between the shaft member 50 and the gear member 80B by the first temporary fixing portion shown in FIG. 25, as shown in FIG. 27, the ridge portion 85 of the first extension portion 87 on the inner surface of the proximal end side in the rotation direction R1 meshes with the teeth 57 of the shaft member 50, and the ridge portion 85 on the inner surface of the fourth extension portion 95 meshes with the teeth 57 of the shaft member 50. This state becomes a temporary fixing state between the shaft member 50 and the gear member 80B by the second temporary fixing portion. In the state shown in FIG. 27, the second extension portion 89 of the gear member 80B abuts on the top portion 39*a* of the cam slope 39 of the base member 20.

Figure 29:
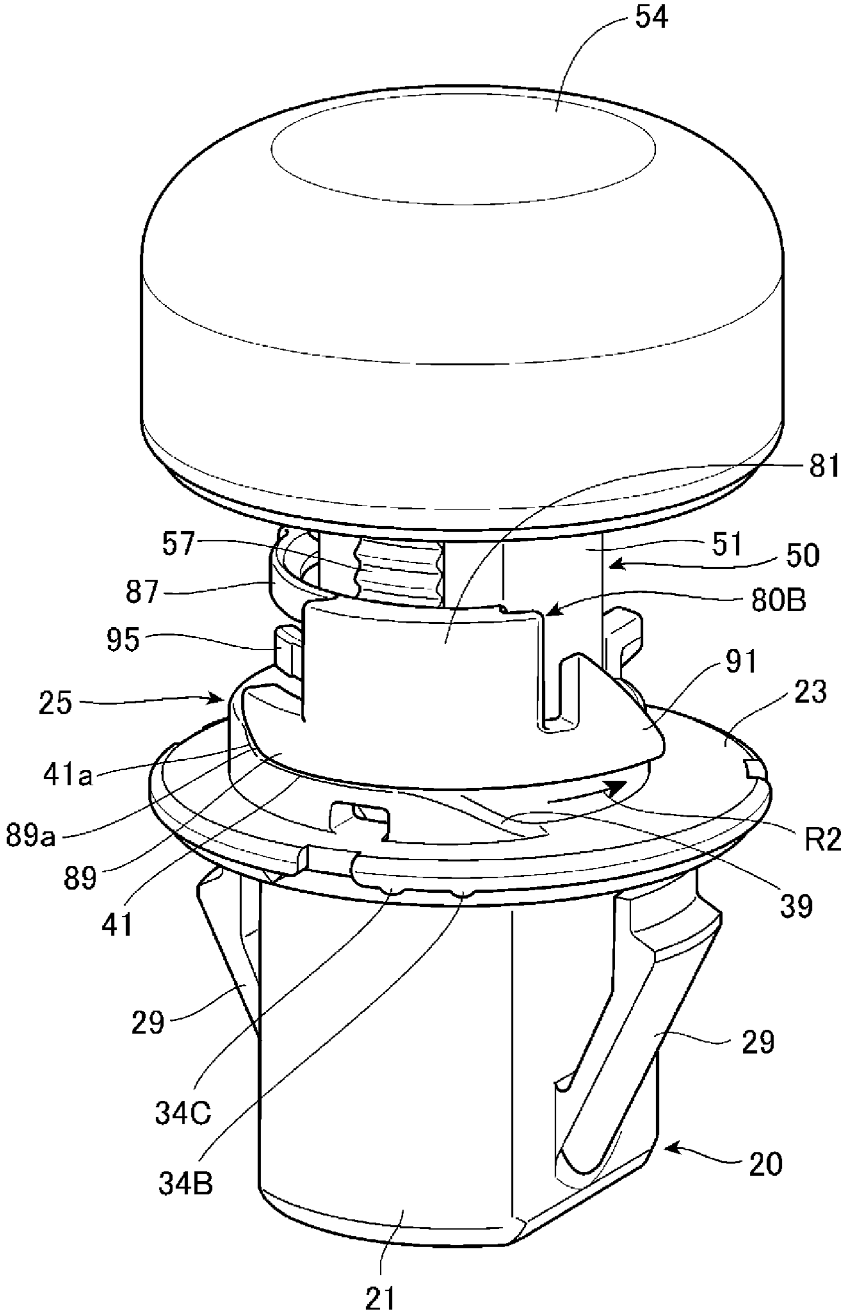
FIG. 29 is a perspective view showing a permanent fixing state between the shaft member and the gear member in the stopper device.

When the gear member 80B is rotated in the R1 direction from the temporary fixing state between the shaft member 50 and the gear member 80B by the second temporary fixing portion shown in FIG. 27, as shown in FIG. 29, the permanent fixing portion 83 meshes with the teeth 57 of the shaft member 50, and the shaft member 50 and the gear member 80B are permanently fixed. In the state shown in FIG. 29, the second extension portion 89 of the gear member 80B rides on the gear riding surface 41 of the base member 20.

The state shown in FIG. 25, the state shown in FIG. 27, and the state shown in FIG. 29 described above are locked due to a relationship between the retaining protrusions 67 of the rotary member 60 and protrusions 34A, 34B, 34C, 34D provided on the back side of the flange portion 23 of the base member 20. (The rotary member 60 is restricted in rotation with respect to the base member 20).

Figure 26A:
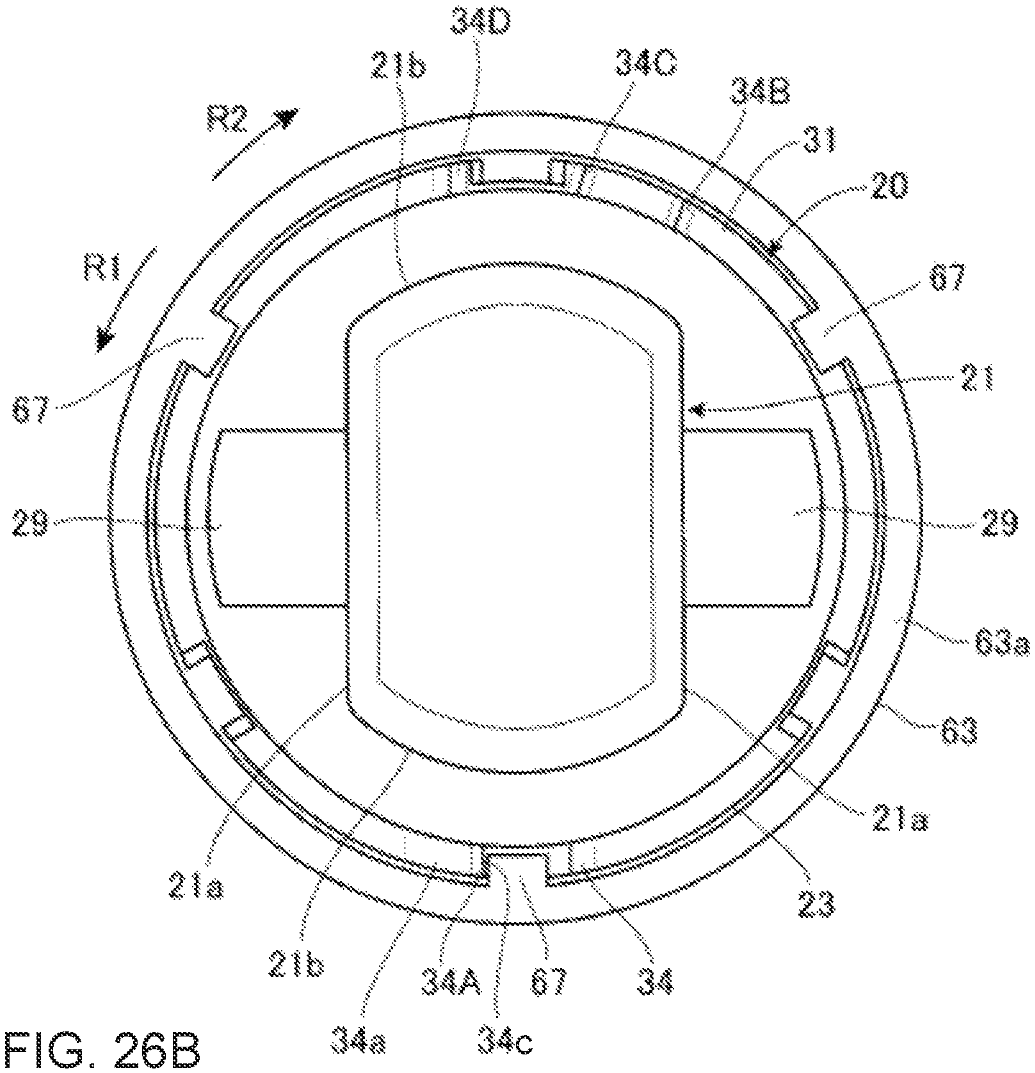
[FIGS. 26A and 26B]
Figure 26B:
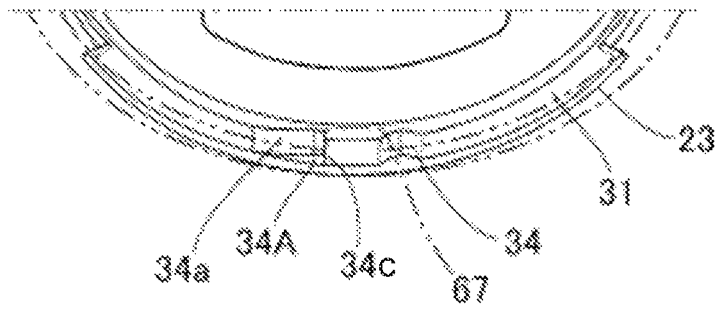

That is, as shown in FIGS. 26A and 26B, the protrusion 34A is provided on the back side of the flange portion 23 of the base member 20 in the present embodiment and at a position close to the other side wall 21*b* of the base body 21. The tapered surface 34*a* is formed on one side surface of the protrusion 34A, a rotation restricted surface 34*c* standing upright with respect to a surface direction of the flange portion 23 is formed on the other side surface of the protrusion 34A. As shown in FIGS. 28A, 28B, 30A and 30B, the pair of protrusions 34B, 34C disposed adjacent to each other in the circumferential direction and the protrusion 34D disposed apart from the protrusion 34C in the circumferential direction protrude from a position on the back side of the flange portion 23 and close to the one side wall 21*b* of the base body 21. Tapered surfaces are formed on both side surfaces of each of the protrusions 34B, 34C, 34D.

In the temporary fixing state shown in FIG. 25 between the shaft member 50 and the gear member 80B by the first temporary fixing portion, in which the ridge portion 85 on the inner surface at the distal end side in the rotation direction R1 of the first extension portion 87 meshes with the teeth 57 of the shaft member 50, as shown in FIGS. 26A and 26B, the rotary member 60 is rotatable in the R1 direction with respect to the base member 20, but is restricted in rotation in the R2 direction. That is, even if the rotary member 60 is to be rotated in the R2 direction in FIG. 7, since the predetermined retaining protrusion 67 of the rotary member 60 abuts on the rotation restricted surface 34*c* of the protrusion 34A, the rotary member 60 is restricted in rotation with respect to the base member 20.

Figure 28A:
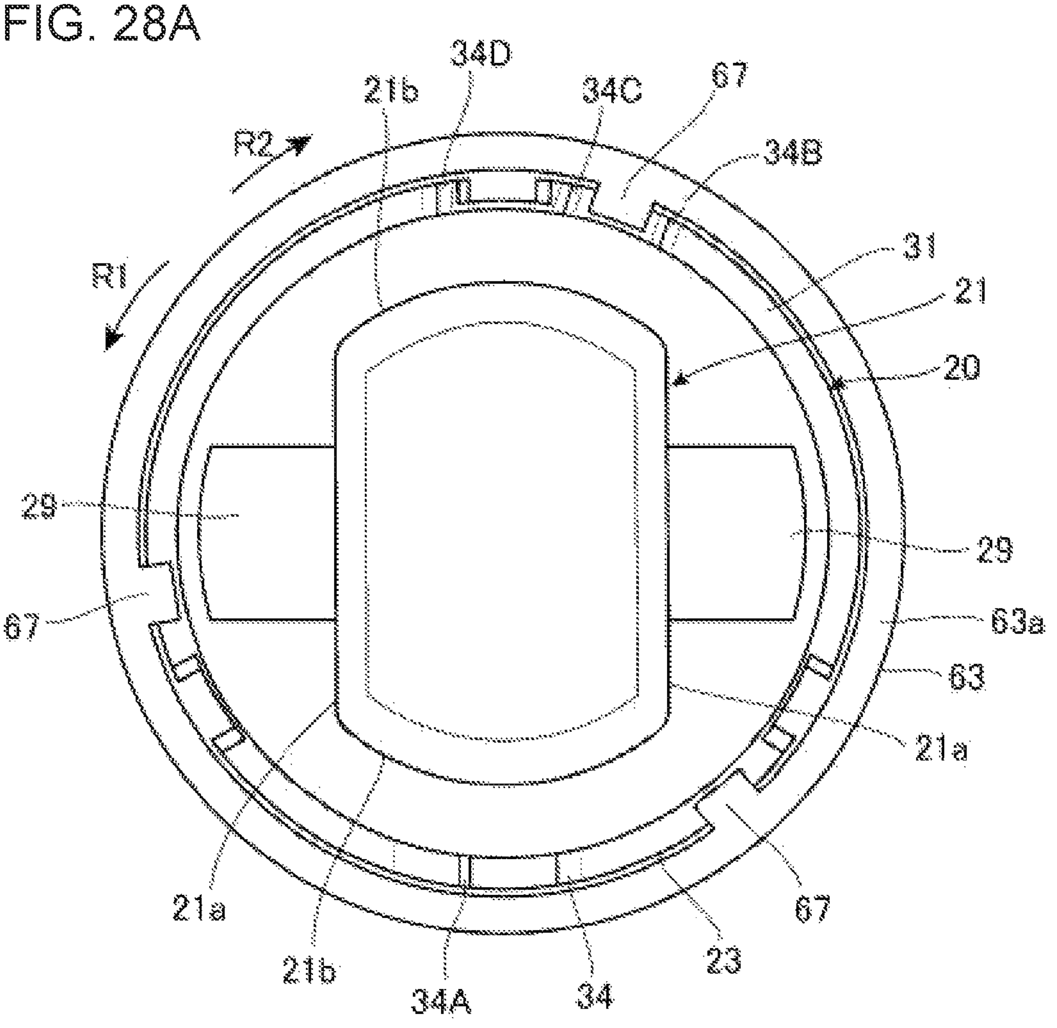
[FIGS. 28A and 28B]
Figure 28B:
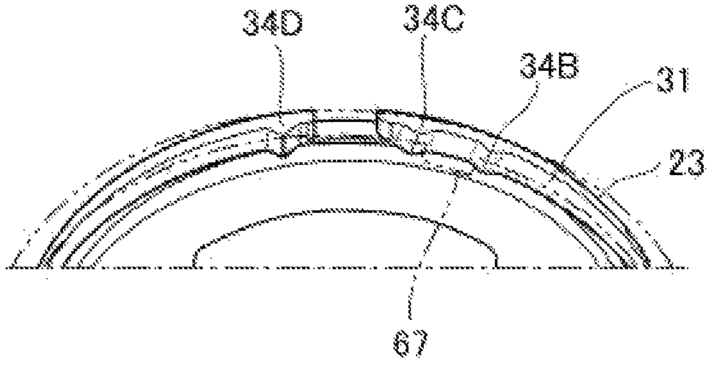

In the temporary fixing state shown in FIG. 27 between the shaft member 50 and the gear member 80B by the second temporary fixing portion, in which the ridge portion 85 on the inner surface of the proximal end side of the first extension portion 87 in the rotation direction R1 meshes with the teeth 57 of the shaft member 50 and the ridge portion 85 on the inner surface of the fourth extension portion 95 meshes with the teeth 57 of the shaft member 50, as shown in FIGS. 28A and 28B, the predetermined retaining protrusion 67 of the rotary member 60 is disposed between the pair of protrusions 34B, 34C. Therefore, the rotary member 60 is restricted in rotation with respect to the base member 20 unless the rotary member 60 is rotated in the R1 direction or the R2 direction with a rotational force equal to or greater than a predetermined value to climb over the tapered surfaces of the protrusions 34B, 34C.

Figure 30A:
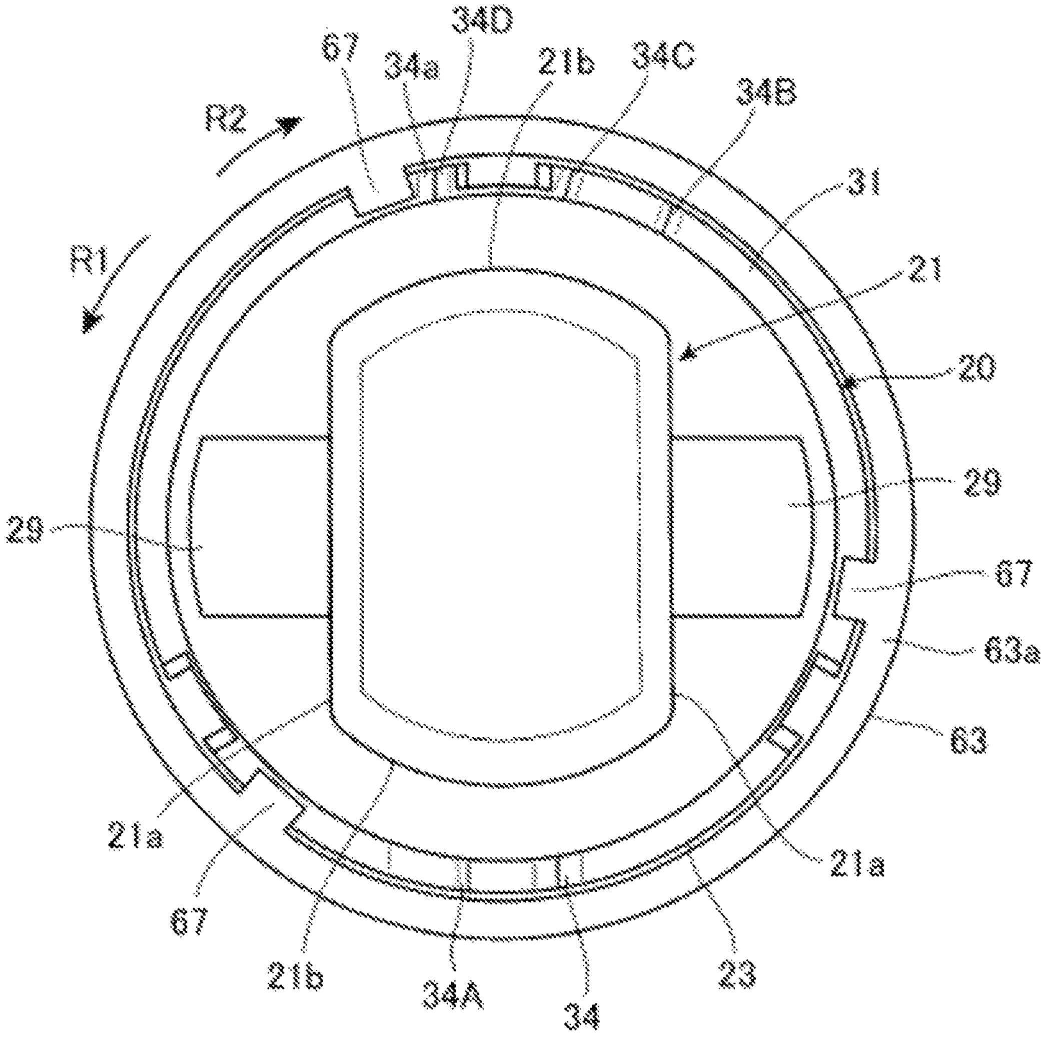
[FIGS. 30A and 30B]
Figure 30B:
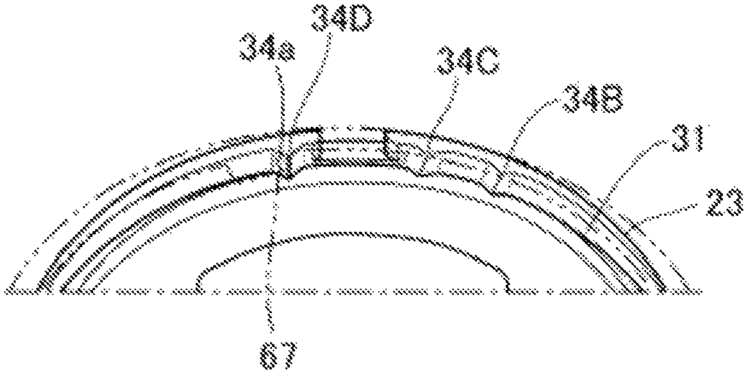

Furthermore, in the state shown in FIG. 29 where the permanent fixing portion 83 meshes with the teeth 57 of the shaft member 50 and the shaft member 50 and the gear member 80B are permanently fixed, as shown in FIGS. 30A and 30B, the predetermined retaining protrusion 67 of the rotary member 60 is disposed at a position adjacent to the tapered surface 34*a* of the protrusion 34D. Therefore, the rotary member 60 is restricted in rotation with respect to the base member 20 in the R2 direction unless the predetermined retaining protrusion 67 climbs over the tapered surface 34*a* of the protrusion 34D. On the other hand, regarding the rotation in the R1 direction, as shown in FIG. 29, the rotary member 60 is restricted in rotation with respect to the base member 20 due to the abutting between the gear abutting surface 41*a* of the base member 20 and the cam abutting portion 89*a* of the second extension portion 89 of the gear member 80B.

In the present embodiment, the ridge portions 85, 85 provided on the inner surfaces of the two extension portions 87, 95 extending from one side portion in the circumferential direction of the permanent fixing portion 83 constitute the portion forming the first temporary fixing portion and the portion forming the second temporary fixing portion, but the portion forming the first temporary fixing portion and the portion forming the second temporary fixing portion are not limited to such an aspect. For example, (1) three or more extension portions may be provided from one side portion of the permanent fixing portion, and the ridge portions on inner surfaces of the extension portions may be set as portions forming the first and second temporary fixing portions, and (2) one extension portion may be provided from one side portion of the permanent fixing portion and a distal end portion in an extending direction (the distal end portion in the rotation direction R1) may be narrow, which is set as the portion forming the first temporary fixing portion, and a intermediate portion in the extending direction may be widened and set as the portion forming the second temporary fixing portion.

Figure 31:
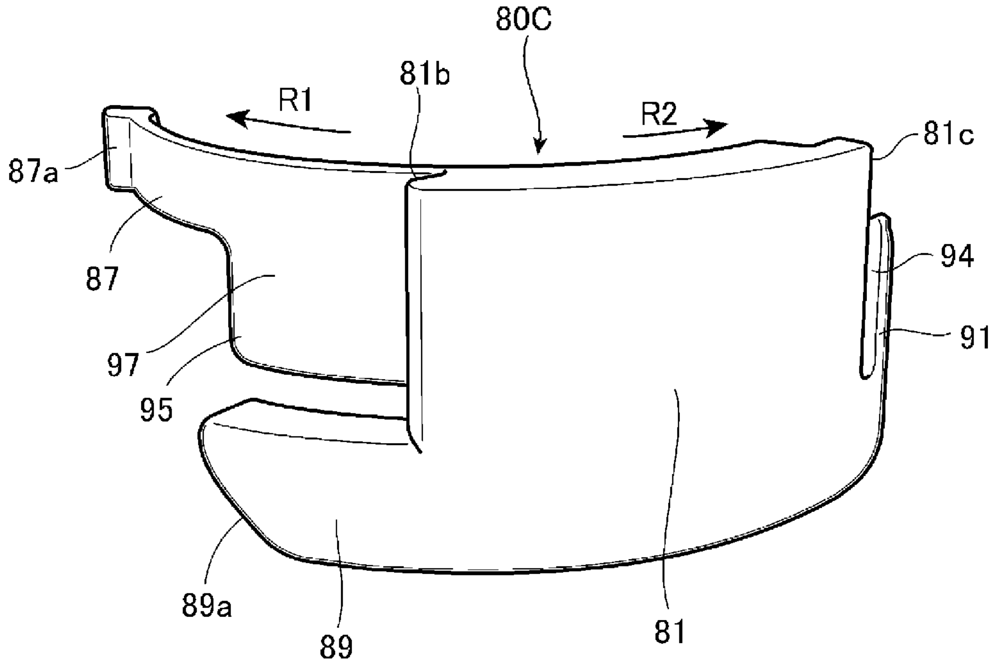
FIG. 31 is an enlarged perspective view showing a modification of the gear member constituting the stopper device.
Figure 32:
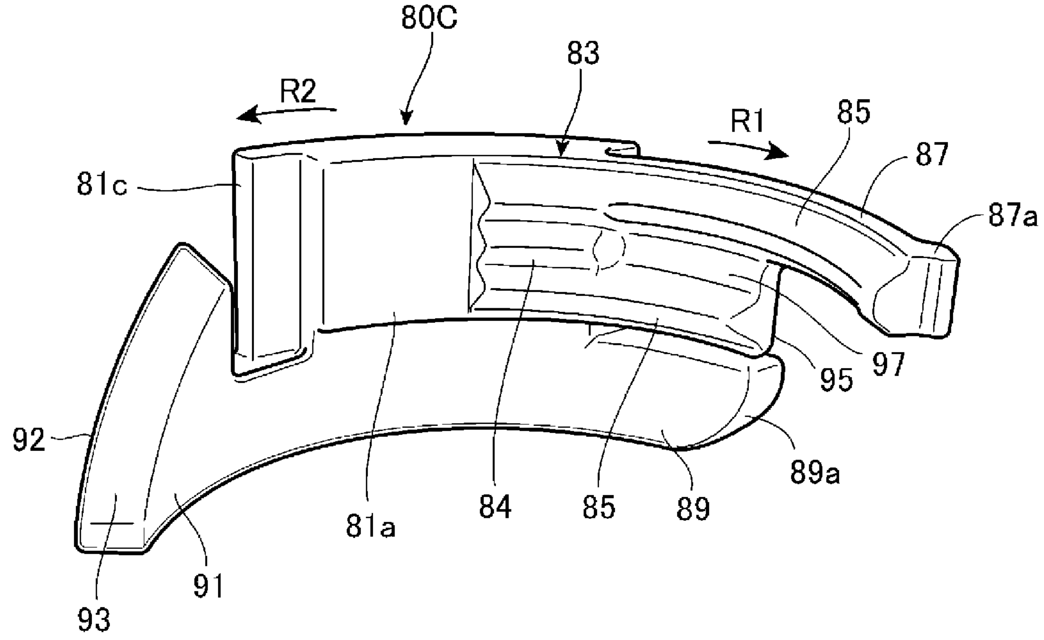
FIG. 32 is an enlarged perspective view of the gear member according to the modification when viewed from a direction different from that in FIG. 31.

A modification of the gear member is shown in FIGS. 31 and 32.

In a gear member 80C, a connecting wall portion 97 extends from a portion between the first extension portion 87 and the fourth extension portion 95, which is one side portion of the permanent fixing portion 83, and the first extension portion 87 and the fourth extension portion 95 are connected to the connecting wall portion 97. The ridge portions 85 provided on the inner surfaces of the extension portions 87, 95 do not protrude from the inner surface of the connecting wall portion 97, and the connecting wall portion 97 is thinner than the extension portions 87 and 95.

Example of Using Method of Embodiment Shown in FIGS. 23 to 33

Next, an example of a using method of the stopper device according to the present embodiment will be described with reference to FIG. 33.

In this case, the fixed member 1 is a vehicle body frame of a one-box car, a hatchback car, or the like, and the movable member 5 is a so-called back door.

First, the movable member 5 is held by a jig while being opened from the opening of the vehicle body frame which is the fixed member 1, and then painted (step S1).

After that, the stopper device is attached to a peripheral edge of the opening of the fixed member 1, and the gear member 80B is rotated via the rotary member 60, and the shaft member 50 and the gear member 80B are temporarily fixed by the second temporary fixing portion shown in FIG. 27 (step S2).

Next, the movable member 5 is closed with respect to the opening of the fixed member 1 (step S3). In this case, the shaft member 50 and the gear member 80B are temporarily fixed by the second temporary fixing portion, and the temporary fixing force thereof is larger than the temporary fixing force between the shaft member 50 and the gear member 80B by the first temporary fixing portion, and thus, even if a pushing force from the movable member 5 is applied to the shaft member 50, the shaft member 50 does not descend. Therefore, the movable member 5 is not completely closed with respect to the opening of the fixed member 1, and the movable member 5 is kept slightly floating from the opening of the fixed member 1 (gap is generated between the opening of the fixed member 1 and the movable member 5).

By using the gap between the opening of the fixed member 1 and the movable member 5, various members such as a striker and a weather strip are attached to the movable member 5, and a member such as a gas stay is attached between the fixed member 1 and the movable member 5 (step S4).

After that, the gear member 80B is rotated in the R2 direction via the rotary member 60, and the shaft member 50 and the gear member 80B are temporarily fixed by the first temporary fixing portion as shown in FIG. 25. After that, by pushing the movable member 5 into the fixed member 1, the ridge portion 85 of the first extension portion 87 forming the first temporary fixing portion meshes with the teeth 57 of the shaft member 50 step by step, and the shaft member 50 descends. Then, by aligning the surface of the movable member 5 with a peripheral edge on the front side of the opening of the fixed member 1, the protrusion amount of the abutting portion 54 with respect to the fixed member 1 is adjusted (step S5).

Next, the movable member 5 is opened from the opening of the fixed member 1, the gear member 80B is rotated in the R1 direction via the rotary member 60, and the shaft member 50 and the gear member 80B are permanently fixed by meshing the permanent fixing portion 83 with the teeth 57 of the shaft member 50 as shown in FIG. 29. As a result, the ascending and descending motion of the shaft member 50 is restricted, and the protrusion amount of the abutting portion 54 with respect to the fixed member 1 is fixed (step S6).

Operations and Effects of Embodiment Shown in FIGS. 23 to 33

Next, operations and effects of the stopper device including the above structures will be described.

That is, in the present embodiment, the temporary fixing portion includes the first temporary fixing portion and the second temporary fixing portion, and the temporary fixing force between the shaft member 50 and the gear member 80B by the second temporary fixing portion is larger than the temporary fixing force between the shaft member 50 and the gear member 80B by the first temporary fixing portion.

Therefore, in the state where the gear member 80B is temporarily fixed to the shaft member 50 by the second temporary fixing portion (see FIG. 27), the temporary fixing force between the shaft member 50 and the gear member 80B can be larger than that in the state where the gear member 80B is temporarily fixed to the shaft member 50 by the first temporary fixing portion (see FIG. 25).

Figure 33:
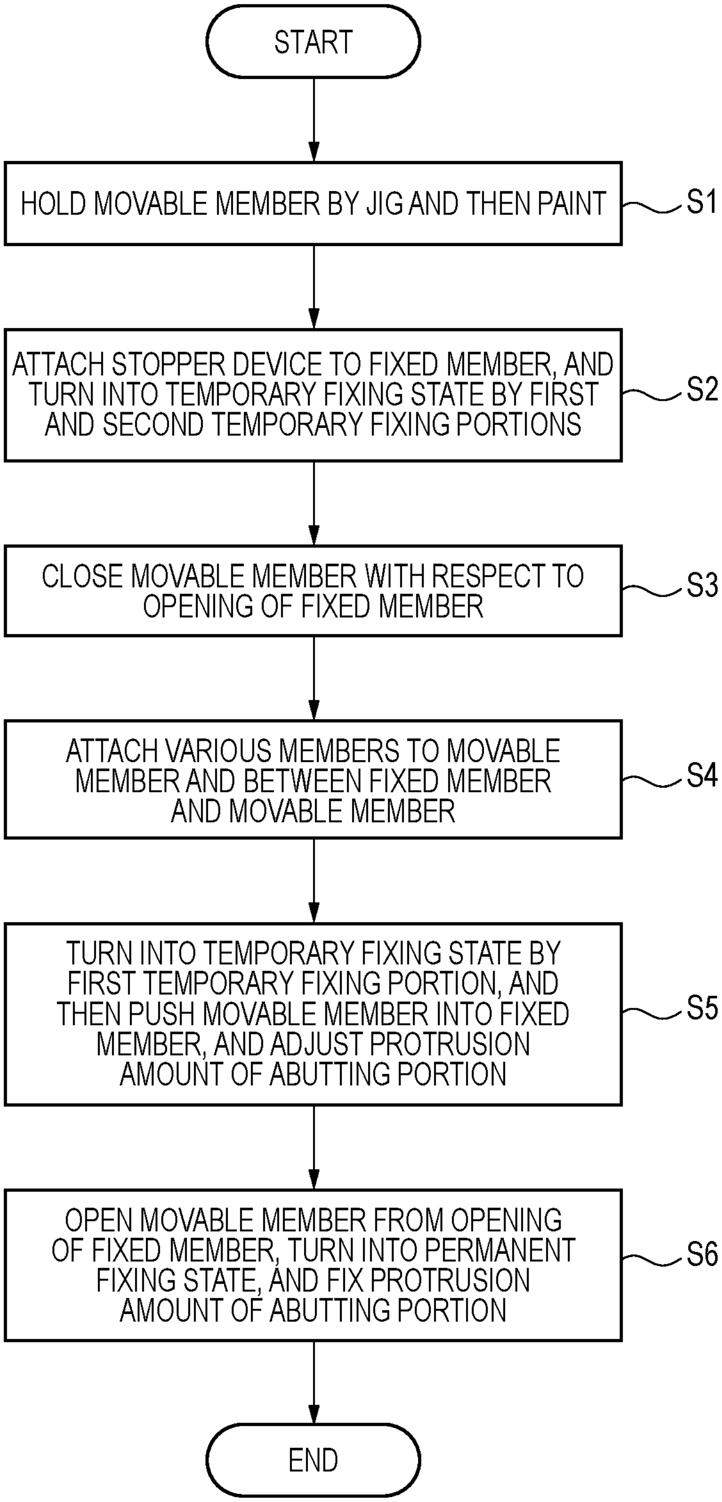
FIG. 33 is a flowchart showing a using method of the stopper device.

As a result, as shown in step S3 in FIG. 33, when the movable member 5 is moved toward the fixed member 1, the gap can be provided between the fixed member 1 and the movable member 5 to suppress the movable member 5 from coming into contact with the fixed member 1 (here, to suppress the peripheral edge of the movable member 5 from coming into contact with the peripheral edge of the opening of the fixed member 1).

Therefore, as shown in step S4 in FIG. 33, by using the gap between the fixed member 1 and the movable member 5, various members such as a striker and a weather strip can be attached to the movable member 5, and a member such as a gas stay can be attached between the fixed member 1 and the movable member 5, and workability of attaching a member such as a striker can be improved.

As described above, if the movable member 5 comes into contact with the fixed member 1 when the movable member 5 is moved toward the fixed member 1, a step of moving the movable member 5 away from the fixed member 1 is required when attaching various members such as a striker, which is complicated.

In the present embodiment, when the rotary member 60 is rotated such that the gear member 80B is ascended by the cam mechanism, the portion forming the permanent fixing portion 83 of the gear member 80B is disposed on the proximal end side in the rotation direction R1, the portion forming the first temporary fixing portion of the gear member 80B (portion indicated by K1 in FIG. 23) is disposed on the distal end side in the rotation direction R1, and the portion forming the second temporary fixing portion of the gear member 80B (portion indicated by K2 in FIG. 23) is disposed between the portion forming the first temporary fixing portion and the portion forming the permanent fixing portion 83.

According to the above aspect, since the structure as described above is adopted, when the gear member 80B is rotated in the R1 direction via the rotary member 60, first, the gear member 80B is temporarily fixed to the shaft member 50 by the first temporary fixing portion (see FIG. 25), and then the gear member 80B is temporarily fixed to the shaft member 50 by the second temporary fixing portion by further rotating the gear member 80B in the R1 direction (see FIG. 27).

As a result, when the gear member 80B is temporarily fixed to the shaft member 50 by the second temporary fixing portion, the workability of attaching various members such as a striker to the movable member 5 and between the fixed member 1 and the movable member 5 can be improved, and when the gear member 80B is temporarily fixed to the shaft member 50 by the first temporary fixing portion, the protrusion amount of the abutting portion 54 with respect to the fixed member 1 can be adjusted.

In the present embodiment, along the rotation direction (R1 direction) of the gear member 80B at the time of being permanently fixed, the portion forming the first temporary fixing portion, the portion forming the second temporary fixing portion, and the permanent fixing portion 83 of the gear member 80B are arranged in order, and thus, the operator can work easily and sensually.

Furthermore, as shown in FIGS. 23 and 24, in the present embodiment, the gear member 80B has the two extension portions 87 and 95 extending in the rotation direction R1 from one side portion in the circumferential direction of the permanent fixing portion 83, the ridge portion 85 serving as the portion forming the second temporary fixing portion is provided on the one extension portion (fourth extension portion 95), the ridge portion 85 serving as the portion forming the first temporary fixing portion is provided on the distal end side of the other extension portion (first extension portion 87) further than the one extension portion (fourth extension portion 95), and the other extension portion (first extension portion 87) extends longer than the one extension portion (fourth extension portion 95).

According to the above aspect, since the structure as described above is adopted, it becomes easy to provide a difference between the temporary fixing force between the shaft member 50 and the gear member 80B by the first temporary fixing portion and the temporary fixing force between the shaft member 50 and the gear member 80B by the second temporary fixing portion. That is, since the fourth extension portion 95 which is the one extension portion is shorter than the first extension portion 87 which is the other extension portion, the fourth extension portion 95 which is the one extension portion is made more difficult to deform than the first extension portion 87 which is the other extension portion, and the temporary fixing force of the second temporary fixing portion can be made higher than the temporary fixing force of the first temporary fixing portion. As a result, the structure that the temporary fixing force between the shaft member 50 and the gear member 80B by the second temporary fixing portion becomes larger than the temporary fixing force between the shaft member 50 and the gear member 80B by the first temporary fixing portion is easily implemented.

In the structure in which the first extension portion 87 and the fourth extension portion 95 are connected to the connecting wall portion 97 as in the gear member 80C shown in FIGS. 31 and 32, it is possible to increase the rigidity of the portions of both the extension portions 87, 95, which are connected by the connecting wall portion 97, to suppress bending deformation. As a result, it is possible to obtain an effect that a temporary fixing force of the gear member 80C to the shaft member 50 by the second temporary fixing portion can be further increased.

The present invention is not limited to the embodiments described above, various modifications can be made within the scope of the gist of the present invention, and such embodiments are also included in the scope of the present invention.

REFERENCE SIGNS LIST

1: fixed member
5: movable member
10: stopper device
20: base member
39: cam slope
50, 50A: shaft member
54: abutting portion
57, 58: tooth
60: rotary member
80, 80A, 80B, 80C: gear member
83, 83A: permanent fixing portion
85: ridge portion
87: first extension portion
89: second extension portion
91: third extension portion
95: fourth extension portion
100: seal ring

The invention claimed is:

1. A stopper device configured to be disposed between a fixed member and a movable member configured to move toward and away from the fixed member, comprising:

a base member configured to be fixed to one of the fixed member and the movable member;

a shaft member having an abutting portion configured to abut on another of the fixed member and the movable member, and housed in the base member so as to be ascendable and descendable in a rotation restricted state;

a rotary member mounted so as to be rotatable and not to be ascendable and descendable with respect to the base member;

a gear member disposed inside the rotary member in a state where rotation is restricted with respect to the rotary member;

a temporary fixing portion disposed between the shaft member and the gear member and configured to temporarily fix the gear member to the shaft member; and a cam mechanism disposed between the base member and the gear member, including a cam slope and a cam abutting portion configured to abut on the cam slope, and configured to cause the gear member to ascend with respect to the rotary member by rotation of the rotary member in a predetermined direction, wherein when the gear member rotates in conjunction with the rotation of the rotary member, the shaft member is ascended by the cam mechanism while maintaining a temporary fixing state of the shaft member by the temporary fixing portion, and the gear member further includes a permanent fixing portion configured to restrict an ascending and descending motion of the shaft member in an ascended state.

2. The stopper device according to claim 1, wherein the gear member includes a plate-shaped piece that curves and extends along an inner periphery of the rotary member.

3. The stopper device according to claim 2, wherein the gear member includes an extension portion extending in a circumferential direction from one side portion of the permanent fixing portion, and the extension portion is provided with the temporary fixing portion.

4. The stopper device according to claim 3, wherein a plurality of teeth are formed along an axial direction in a predetermined range in a circumferential direction of an outer peripheral surface of the shaft member, and ridge portions configured to mesh with the teeth of the shaft member are continuously provided over an inner surface of the permanent fixing portion of the gear member and an inner surface of the extension portion of the gear member.

5. The stopper device according to claim 1, wherein a structure for causing the ascended gear member to descend when the rotary member is rotated in a direction opposite to that when the shaft member is ascended, is provided between the base member and the gear member.

6. The stopper device according to claim 1, wherein the temporary fixing portion includes a first temporary fixing portion and a second temporary fixing portion, and a temporary fixing force between the shaft member and the gear member by the second temporary fixing portion is larger than a temporary fixing force between the shaft member and the gear member by the first temporary fixing portion.

7. The stopper device according to claim 6, wherein when the rotary member is rotated such that the gear member is ascended by the cam mechanism, a portion forming the permanent fixing portion of the gear member is disposed on a proximal end side in a rotation direction, a portion forming the first temporary fixing portion of the gear member is disposed on a distal end side in the rotation direction, and a portion forming the second temporary fixing portion of the gear member is disposed between the portion forming the first temporary fixing portion and the portion forming the permanent fixing portion.

8. The stopper device according to claim 7, wherein the gear member has two extension portions extending in the rotation direction from one side portion of the portion forming the permanent fixing portion, a ridge portion serving as the portion forming the second temporary fixing portion is provided on one of the extension portions, a ridge portion serving as the portion forming the first temporary fixing portion is provided on a distal end side of another of the extension portions further than the one extension portion, and the another extension portion extends longer than the one extension portion.

9. The stopper device according to claim 1, wherein the gear member is separate from the rotary member.

* * * * *